(12) United States Patent
Oza et al.

(10) Patent No.: US 11,762,069 B2
(45) Date of Patent: Sep. 19, 2023

(54) TECHNIQUES FOR DETERMINING ORIENTATION OF A TARGET USING LIGHT POLARIZATION

(71) Applicant: AEVA, INC., Mountain View, CA (US)

(72) Inventors: Neal N. Oza, Palo Alto, CA (US); Omer P. Kocaoglu, Fremont, CA (US); Behsan Behzadi, Sunnyvale, CA (US); Oguzhan Avci, San Francisco, CA (US); Keith Gagne, Santa Clara, CA (US); Mina Rezk, Haymarket, VA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 18/054,750

(22) Filed: Nov. 11, 2022

(65) Prior Publication Data

US 2023/0068524 A1    Mar. 2, 2023

Related U.S. Application Data

(63) Continuation of application No. 16/712,749, filed on Dec. 12, 2019, now Pat. No. 11,525,901.

(51) Int. Cl.
*G02B 27/28* (2006.01)
*H04J 14/02* (2006.01)
(Continued)

(52) U.S. Cl.
CPC .......... *G01S 7/484* (2013.01); *G02B 27/1006* (2013.01); *G02B 27/283* (2013.01); *H04J 14/02* (2013.01)

(58) Field of Classification Search
CPC ... G01S 7/484; G02B 27/1006; G02B 27/283; G02B 26/122; G02B 27/28;
(Continued)

(56) References Cited

U.S. PATENT DOCUMENTS 6,956,878 B1   10/2005   Trisnadi
2014/0146303 A1   5/2014   Mitchell et al.
(Continued)

FOREIGN PATENT DOCUMENTS

EP   2705350 A1   3/2014
WO   2010125562   11/2010

OTHER PUBLICATIONS

Transmittal of the International Search Report and Written Opinion of the International Searching Authority dated Feb. 25, 2021 for International Application No. PCT/US2020/058140, filed Oct. 30, 2020, pp. 14.
(Continued)

*Primary Examiner* — Hibret A Woldekidan
(74) *Attorney, Agent, or Firm* — Womble Bond Dickinson (US) LLP

(57) ABSTRACT

A method is provided that transmits a beam of co-propagating, cross-polarized light to a target. The method receives return light reflected from the target, which includes a first polarization and a second polarization. The method splits the return light into a first output corresponding to the first polarization and a second output corresponding to the second polarization using a first beam splitter. The method directs the first output to a first detector and directs the second output to a second detector. The method generates, by the first detector, a first electrical signal corresponding to the first polarization, and generates, by the second detector, a second electrical signal corresponding to the second polarization. The method determines an orientation of the target based on the first electrical signal and the second electrical signal, and generates a point cloud based on the orientation of the target.

18 Claims, 18 Drawing Sheets

(51) Int. Cl.
*G01S 7/484* (2006.01)
*G02B 27/10* (2006.01)

(58) Field of Classification Search
CPC ........ G02B 27/286; H04J 14/02; H04J 14/06; H04B 10/0795; H04B 10/548; H04B 10/614; H04B 10/6166
USPC ...................................... 398/25, 26, 65, 187
See application file for complete search history.

(56) References Cited

U.S. PATENT DOCUMENTS

| | | | |
|---|---|---|---|
| 2017/0184399 A1* | 6/2017 | Thayer | G01S 7/499 |
| 2019/0025426 A1* | 1/2019 | Satyan | G02B 27/30 |
| 2020/0064482 A1 | 2/2020 | Lee | |

OTHER PUBLICATIONS

International Preliminary Report on Patentability of the International Searching Authority dated Jun. 23, 2022, for International Application No. PCT/US2020/058169, filed Oct. 30, 2020, pp. 8.
Xu, Z. et al. (May 1, 2019). "Multifunction Lidar System Based on Polarization-Division Multiplexing," Journal of Lightwave Technology, 37(9):2000-2007.
Zhu, X. et al. (2005). "A High Resolution 3D Laser Camera for 3D Object Digitization," Proc. of SPIE, 4791:120-127.
Zhongyang et al.; "Compact All-Fiber Polarization Coherent Lidar Based on a Polarization Modulator", IEEE Transactions on Instrumentation and Measurement, IEEE Service Center Piscataway, NJ., US, vol. 69, No. 5, Jun. 20, 2019, pp. 2193-2198.

* cited by examiner

TECHNIQUES FOR DETERMINING ORIENTATION OF A TARGET USING LIGHT POLARIZATION

CROSS REFERENCE TO RELATED APPLICATIONS

This application is a continuation of U.S. application Ser. No. 16/712,749 filed on Dec. 12, 2019, entitled "DETERMINING CHARACTERISTICS OF A TARGET USING POLARIZATION ENCODED COHERENT LIDAR," the entire contents of which are hereby incorporated by reference.

TECHNICAL FIELD

The present disclosure relates generally to a frequency-modulated continuous wave (FMCW) light detection and ranging (LIDAR) system that utilizes polarization.

BACKGROUND

Traditional LIDAR systems operate by sending pulses toward a target and measuring the time the pulses take to reach the target and return. In such time-of-flight systems, the user learns information about the distance to the object, which when coupled with a scanner can provide a 3-D point cloud of the sensor's field-of-view.

SUMMARY

The present disclosure includes, without limitation, the following example implementations.

Some example implementations provide a method of operating a light detection and ranging (LIDAR) system. The method includes generating a beam of co-propagating, cross-polarized light using a first polarizing beam splitter; and determining at least one of a material characteristic or orientation of a target using the co-propagating, cross-polarized light. In some embodiments, the method also includes splitting light reflected from the target into a first output directed to a first detector and a second output directed to a second detector using a second polarizing beam splitter; and determining a reflectivity and/or orientation of the target based on a comparison of a signal-to-noise ratio between signals from the first detector and the second detector. In some embodiments, the method also includes splitting the co-propagating, cross-polarized light into a local oscillator path and a target path using a first beam splitter; receiving the local oscillator path light at a third polarizing beam splitter; transmitting the target path light to the target and directing light reflected from the target to the second polarizing beam splitter using an optical path discriminator; mixing the transmitted output of the third polarizing beam splitter and the transmitted output of the second polarizing beam splitter using a first light mixer; mixing the reflected output of the third polarizing beam splitter and the reflected output of the second polarizing beam splitter using a second light mixer; receiving combined light from the first light mixer at the first detector; and receiving combined light from the second light mixer at the second detector. In some embodiments, the method also includes biasing light to the first and second detectors in favor of light from the target path using the first and second light mixers. In some embodiments, the method also includes receiving light from a plurality of laser sources at the first polarizing beam splitter. In some embodiments, the method also includes receiving a transmitted output from the second polarizing beam splitter and a reflected output from the third polarizing beam splitter at the first light mixer; and receiving a reflected output from the second polarizing beam splitter and a transmitted output from the third polarizing beam splitter at the second light mixer. In some embodiments, the method also includes transmitting light having different frequency patterns using the plurality of laser sources. In some embodiments, the method also includes combining a first pair of light inputs having dissimilar wavelengths and opposite polarizations using a first wavelength division multiplexer (WDM); combining a second pair of light inputs having dissimilar wavelengths and opposite polarizations using a second WDM; receiving combined light from the first WDM and the second WDM at the first polarizing beam splitter; and separating the combined light from the first light mixer and the second light mixer by wavelength before directing the light to the first detector and the second detector. In some embodiments, the method also includes receiving light at the first polarizing beam splitter from a second beam splitter operatively coupled to a single laser source; receiving reflected outputs from the second and third polarizing beam splitters at the first light mixer; and receiving transmitted outputs from the second and third polarizing beam splitters at the second light mixer.

Another example implementation provides a light detection and ranging (LIDAR) apparatus including a first polarizing beam splitter configured to receive light at a first light input and a second light input and transmit co-propagating, cross-polarized light to a target; a second polarizing beam splitter configured to split light reflected from the target into a transmitted output directed to a first detector and a transmitted output directed to a second detector; and a processing device configured to determine at least one of a material characteristic or an orientation of the target based on a comparison of a signal-to-noise ratio between signals from the first detector and the second detector. In some embodiments, the first detector and the second detector are configured to transmit signals to the processing device. In some embodiments, the apparatus also includes a first beam splitter configured to split the co-propagating, cross-polarized light into a local oscillator path and a target path; a third polarizing beam splitter configured to receive the local oscillator path light; an optical path discriminator configured to transmit the target path light to a target and direct light reflected from the target to the second polarizing beam splitter; a first light mixer configured to mix light from the transmitted output of the second polarizing beam splitter and a reflected output of the third polarizing beam splitter; and a second light mixer configured to mix light from the reflected output of the second polarizing beam splitter and a transmitted output of the third polarizing beam splitter, wherein the first detector is configured to receive combined light from the first light mixer and the second detector is configured to receive combined light from the second light mixer. In some embodiments, the first and second light mixers are configured to bias light to the first and second detectors in favor of light from the target path. In some embodiments, the first light input and the second light input are configured to receive light from a plurality of light sources. In some embodiments, the plurality of light sources are configured to transmit light having different frequency patterns. In some embodiments, the apparatus also includes a wavelength division multiplexer (WDM) configured to combine light from the first laser source and the second laser source when they have dissimilar wavelengths. In some embodiments, the first and second light inputs are configured to receive light from a second beam splitter operatively coupled to a single laser source. In some embodiments, the first light mixer is configured to receive reflected outputs from the second and third polarizing beam splitters, and the second light mixer is configured to receive transmitted outputs from the second and third polarizing beam splitters. In some embodiments, the apparatus also includes a second beam splitter configured to split the co-propagating, cross-polarized light into a second local oscillator path; a third beam splitter configured to split a portion of the target path into a second target path; a fourth polarizing beam splitter configured to receive the local oscillator path light; a second optical path discriminator configured to transmit the second target path light to the target and direct light reflected from the target to a fifth polarizing beam splitter, the fifth polarizing beam splitter configured to split light reflected from the target into a transmitted output directed to a third detector and a transmitted output directed to a fourth detector; a third light mixer configured to mix light from the transmitted output of the fifth polarizing beam splitter and a reflected output of the fourth polarizing beam splitter; and a fourth light mixer configured to mix light from the reflected output of the fifth polarizing beam splitter and a transmitted output of the fourth polarizing beam splitter, wherein the third detector is configured to receive combined light from the third light mixer and the fourth detector is configured to receive combined light from the fourth light mixer; wherein the processing device is further configured to determine at least one of a material characteristic or an orientation of the target based on a comparison of a signal-to-noise ratio between signals from the first detector, the second detector, the third detector, and the fourth detector. In some embodiments, the apparatus also includes at least one variable polarization rotator located after the first and second beam splitters and configured to transform a polarization state of the polarized light directed to the target.

Another example implementation provides a light detection and ranging (LIDAR) system comprising: a plurality of optical circuits to generate and receive a laser beam, the plurality of optical circuits comprising: a first polarizing beam splitter configured to transmit co-propagating, cross-polarized light to a target; and a second polarizing beam splitter configured to split light reflected from the target into a first output directed to a first detector and a second output directed to a second detector; and a processing device operatively coupled with the plurality of optical circuits to compare a signal-to-noise ratio from the first and second detectors and determine a material characteristic and/or orientation of the target based on the comparison.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects, and advantages will become apparent from the following detailed description taken in conjunction with the accompanying figures which illustrate, by way of example, the principles of some described example implementations.

BRIEF DESCRIPTION OF THE FIGURES

Embodiments and implementations of the present disclosure will be understood more fully from the detailed description given below and from the accompanying drawings of various aspects and implementations of the disclosure, which, however, should not be taken to limit the disclosure to the specific embodiments or implementations, but are for explanation and understanding only.

DETAILED DESCRIPTION

Figure 1:
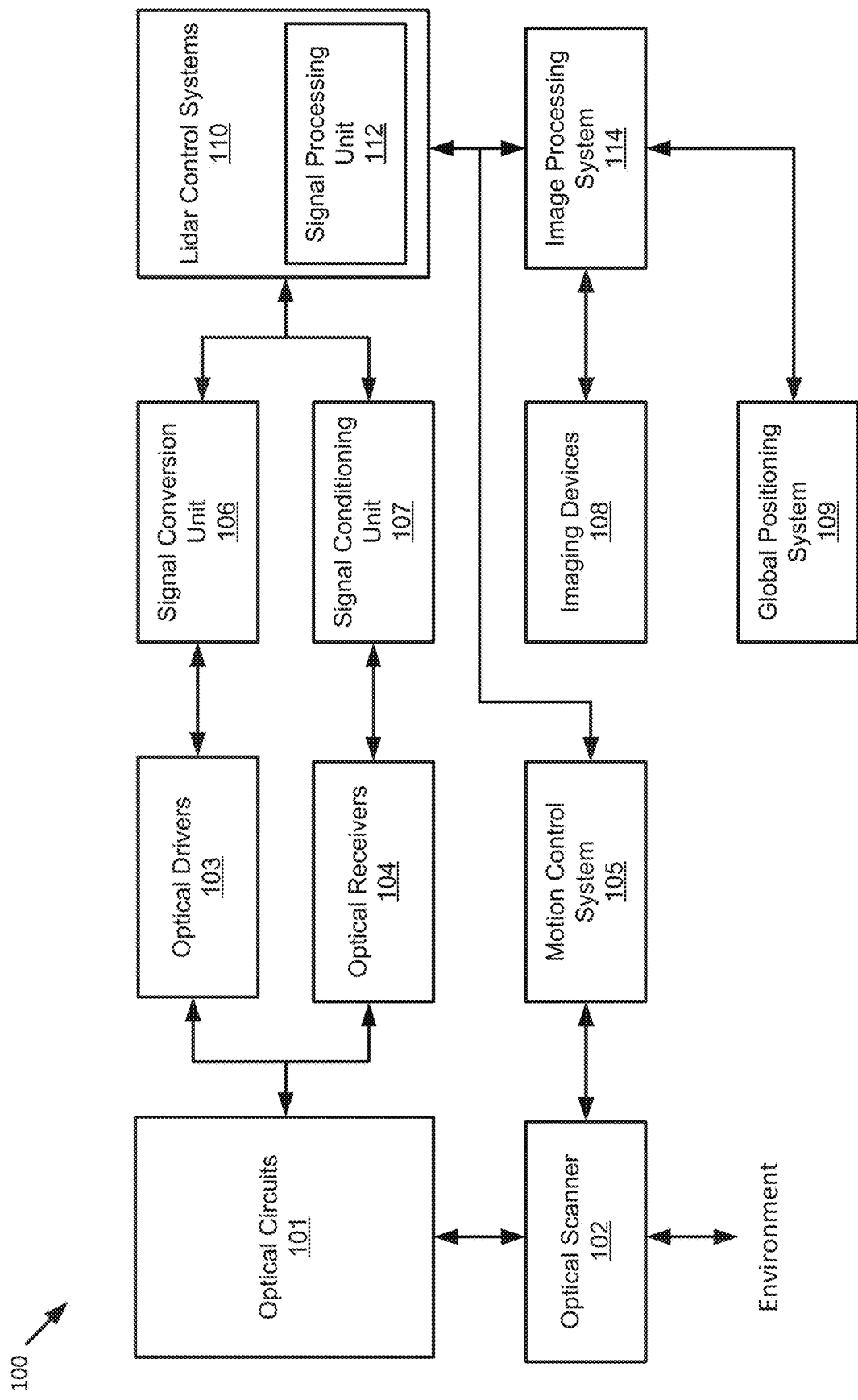
FIG. 1 illustrates a LIDAR system according to example implementations of the present disclosure.

Example implementations of the present disclosure are directed to an improved scanning LIDAR system. Example implementations of the present disclosure are based on a type of LIDAR that uses polarization in order to gather additional data based on the different ways polarized light reflects off materials. Historically, LIDAR systems have not used light polarization as a way to gather additional data about a target or an environment; thus, such systems have not taken advantage of all the information that can potentially be gained from light received using a LIDAR system.

Traditional LIDAR systems operate by sending pulses toward a target and measuring the time the pulses take to reach the target and return. In such time-of-flight systems, the user learns information about the distance to the object, which when coupled with a scanner can provide a 3-D point cloud of the sensor's field-of-view. However, these traditional systems may have certain limitations, e.g., the inability to directly measure the velocity of the target, and the susceptibility to cross-talk from other like systems. An alternative LIDAR system can employ frequency-modulated continuous wave (FMCW) techniques to measure distance and velocity to yield a 4-D LIDAR system.

Example embodiments of the present disclosure additionally use polarization to enhance system performance by enabling orientation estimation and reducing signal-to-noise degradation due to speckle effects. Such systems can provide depth and velocity information simultaneously for each location across a 2-D scan pattern. By using polarization optics, one can ascertain further information about a target's orientation. Furthermore, employing different configurations or polarization optics can mitigate the deleterious effects of speckle on the signal-to-noise ratio (SNR) of the system.

Example embodiments of the present disclosure involve using a co-propagating, cross-polarized beam of light as an outgoing signal. Due to polarization-based differences in the reflectivities of targets, these two signals can have different SNR measurements. One can then use this information to provide further insights into the surrounding environment including, but not limited to, determining material reflectivity or object orientation.

Employing similar system components and geometries, but operated with different polarization properties, one can mitigate the harmful effects of speckle on the SNR. Speckle can occur, for example, due to phase-front variations in turbulent air, or wavelength-scale reflections from uneven surfaces. These effects contribute to SNR fluctuations on the signal if the outgoing signal is fixed. By rapidly modulating the polarization state of the signal transmitted to a target, one can average the spatial-mode coherence, thereby reducing the negative effects of speckle.

Example implementations of the present disclosure can provide enhancements to any sensing market, such as, but not limited to, transportation, manufacturing, metrology, medical, and security. For example, in the automotive industry, such a device can assist with spatial awareness for automated driver assist systems or self-driving vehicles.

FIG. 1 illustrates a LIDAR system 100 according to example implementations of the present disclosure. The LIDAR system 100 includes one or more of each of a number of components, but may include fewer or additional components than shown in FIG. 1. As shown, the LIDAR system 100 includes optical circuits 101. The optical circuits 101 may include a combination of active optical components and passive optical components. Active optical components may generate, amplify, or detect optical signals and the like. In some examples, the active optical circuit includes lasers at different wavelengths, one or more optical amplifiers, one or more optical detectors, or the like.

Passive optical circuits may include one or more optical fibers or waveguides to carry optical signals, and route and manipulate optical signals to appropriate input/output ports of the active optical circuit. The passive optical circuits may also include one or more fiber components such as taps, wavelength division multiplexers, splitters/combiners, polarization beam splitters, collimators, circulators, isolators, or the like. In some embodiments, as discussed further below, the passive optical circuits may include components to transform the polarization state and direct received polarized light to optical detectors using a PBS.

An optical scanner 102 includes one or more scanning mirrors that are swept along respective orthogonal axes to steer optical signals to scan an environment according to a scanning pattern. For instance, the scanning mirrors may be rotatable by one or more galvanometers. The optical scanner 102 also collects light incident upon any objects in the environment into a return laser beam that is returned to the passive optical circuit component of the optical circuits 101. For example, the return laser beam may be directed to an optical detector by a polarization beam splitter. In addition to the mirrors and galvanometers, the optical scanning system may include components such as a quarter-wave plate, lens, anti-reflective coated window or the like.

To control and support the optical circuits 101 and optical scanner 102, the LIDAR system 100 includes LIDAR control systems 110. The LIDAR control systems 110 may include a processing device for the LIDAR system 100. In embodiments, the processing device may be one or more general-purpose processing devices such as a microprocessor, central processing unit, or the like. More particularly, the processing device may be a complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some embodiments, the LIDAR control systems 110 may include a signal processing unit 112 such as a digital signal processor. The LIDAR control systems 110 are configured to output digital control signals to control optical drivers 103. In some embodiments, the digital control signals may be converted to analog signals through signal conversion unit 106. For example, the signal conversion unit 106 may include a digital-to-analog converter. The optical drivers 103 may then provide drive signals to active components of optical circuits 101 to drive optical sources such as lasers and amplifiers. In some embodiments, several optical drivers 103 and signal conversion units 106 may be provided to drive multiple optical sources.

The LIDAR control systems 110 are also configured to output digital control signals for the optical scanner 102. A motion control system 105 may control the optical scanner 102 based on control signals received from the LIDAR control systems 110. For example, a digital-to-analog converter may convert coordinate routing information from the LIDAR control systems 110 to signals interpretable by the galvanometers in the optical scanner 102. In some embodiments, a motion control system 105 may also return information to the LIDAR control systems 110 about the position or operation of components of the optical scanner 102. For example, an analog-to-digital converter may in turn convert information about the galvanometers' position to a signal interpretable by the LIDAR control systems 110.

The LIDAR control systems 110 are further configured to analyze incoming digital signals. In this regard, the LIDAR system 100 includes optical receivers 104 to measure one or more beams received by optical circuits 101. For example, a reference beam receiver may measure the amplitude of a reference beam from the active optical circuit, and an analog-to-digital converter converts signals from the reference receiver to signals interpretable by the LIDAR control systems 110. The optical receivers 104 may be in communication with a signal conditioning unit 107, in some embodiments. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LIDAR control systems 110.

In some applications, the LIDAR system 100 may additionally include one or more imaging devices 108 configured to capture images of the environment, a global positioning system 109 configured to provide a geographic location of the system, or other sensor inputs. The LIDAR system 100 may also include an image processing system 114. The image processing system 114 can be configured to receive the images and geographic location, and send the images and location or information related thereto to the LIDAR control systems 110 or other systems connected to the LIDAR system 100.

In operation according to some examples, the LIDAR system 100 is configured to use nondegenerate laser sources to simultaneously measure range and velocity across two dimensions. This capability allows for real-time, long range measurements of range, velocity, azimuth, and elevation of the surrounding environment. In some example implementations, the system points multiple modulated laser beams to the same target.

In some examples, the scanning process begins with the optical drivers 103 and LIDAR control systems 110. The LIDAR control systems 110 instruct the optical drivers 103 to independently modulate one or more lasers, and these modulated signals propagate through the passive optical circuit to the collimator. The collimator directs the light at the optical scanning system that scans the environment over a preprogrammed pattern defined by the motion control subsystem. The optical circuits may also include polarization wave plates to transform the polarization of the light as it leaves the optical circuits 101. In embodiments, the polarization wave plate may be a quarter-wave plate and/or a half-wave plate. A portion of the polarized light may also be reflected back to the optical circuits 101. For example, lensing or collimating systems may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal. Each beam signal that returns from the target produces a time-shifted waveform. The temporal phase difference between the two waveforms generates a beat frequency measured on the optical receivers (photodetectors). The combined signal can then be reflected to the optical receivers 104. Configuration of optical circuits 101 for polarizing and directing beams to the optical receivers 104 are described further below.

The analog signals from the optical receivers 104 are converted to digital signals using ADCs. The digital signals are then sent to the LIDAR control systems 110. A signal processing unit 112 may then receive the digital signals and interpret them. In some embodiments, the signal processing unit 112 also receives position data from the motion control system 105 and optical scanner 102, as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 2:
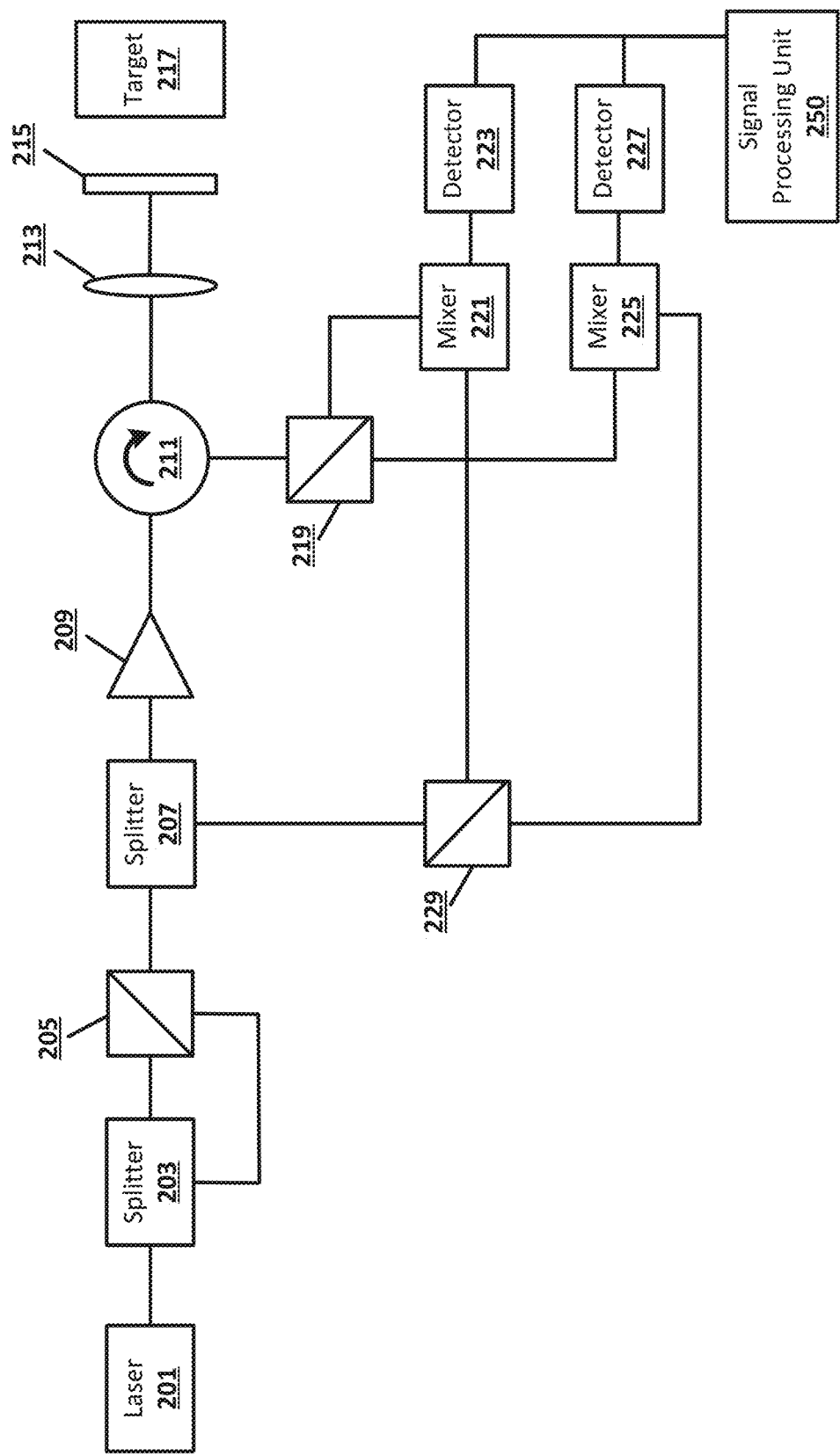
FIG. 2 illustrates a LIDAR system for performing material estimation according to example implementations of the present disclosure.

FIG. 2 illustrates a LIDAR system for performing material estimation according to example implementations of the present disclosure. The LIDAR system includes one or more of each of a number of components, but may include fewer or additional components than shown in FIG. 2. As shown, the LIDAR system includes a laser source 201, a first beam splitter 203, and a first polarizing beam splitter 205. In this example embodiment, a single laser source 201 is split using the first beam splitter 203, and then recombined using the first polarizing beam splitter 205 to generate a beam of co-propagating, cross-polarized light. The beam of cross-polarized light is then split into a target path and a local oscillator (LO) path using a second beam splitter 207. The target path light can be amplified using an optical amplifier 209, and directed to a target 217 through an optical path discriminator 211. The target path light can be directed to the target 217 through a lens system 213 and a polarization wave plate 215, in some embodiments. The light reflected from the target 217 can then be directed through the optical path discriminator 211 to a second polarizing beam splitter 219. According to some embodiments, the optical path discriminator 211 can be a circulator or a beam splitter. In this example embodiment, the LO path light is transmitted from the second beam splitter 207 to a third polarizing beam splitter 229. The second polarizing beam splitter 219 and the third polarizing beam splitter 229 are both configured to transmit light to the first mixer 221 and the second mixer 225. In this example embodiment, the first mixer 221 and second mixer 225 are single-ended and each connects to the first detector 223 and the second detector 227, respectively. However, the first and second mixers 221, 225 could have two or more outputs according to other embodiments.

According to the embodiment shown in FIG. 2, the reflected outputs from each of the second polarizing beam splitter 219 and the second polarizing beam splitter 229 are both directed to the first mixer 221, while the transmitted outputs from the second and third polarizing beam splitters 219, 229 are both directed to the second mixer 225. The use of the second polarizing beam splitter 219 and the second polarizing beam splitter 229 can differentiate the SNR measured on the first detector 223 and the second detector 227. In some embodiments, the first and second mixers 221, 225 do not mix light equally from the LO path and the target path, but instead bias light coming from the target path. For example, the first and second mixers 221, 225 can bias light output to the first and second detectors 223, 227 at a ratio of 80/20, 90/10, or 99/1 in favor of the target path light, in some embodiments.

In this example embodiment, the system also includes a signal processing unit 250 in communication with the first detector 223 and the second detector 227 and configured to analyze signals from the detectors. The detectors measure the optical signal from the mixers and generate proportional electric signals. The signal processing unit 250 can compare the intensities of the signals from the first detector 223 and the second detector 227 and provide insights into the target material reflectivity, surface quality, or orientation. For example, an ice patch, puddle of water, or other reflective surface can largely reflect light only in one polarization parallel to the horizon, such that there is a large amount of light detected polarized parallel to the horizon but not much light detected polarized perpendicular to the horizon. If this is detected, the signal processing unit 250 can determine the reflectivity and orientation of the target material, and can potentially know that there is a puddle or ice patch ahead. A similar phenomenon can also occur with windows on a building that are highly reflective in one polarization.

The input ports of the first polarizing beam splitter 205 are co-polarized, in this example embodiment, but the splitter performs the polarization rotation upon reflection to create a beam of co-propagating, cross-polarized light. When used in reverse, as the second polarizing beam splitter 219 and third polarizing beam splitter 229 are arranged, a cross-polarized source will filter the two polarizations to their respective output ports. This behavior is not the same if free-space polarizing beam splitters are used, wherein a polarization rotator (such as a half wave-plate) is used on at least one of the ports in order to co-polarize the beams.

Figure 3A:
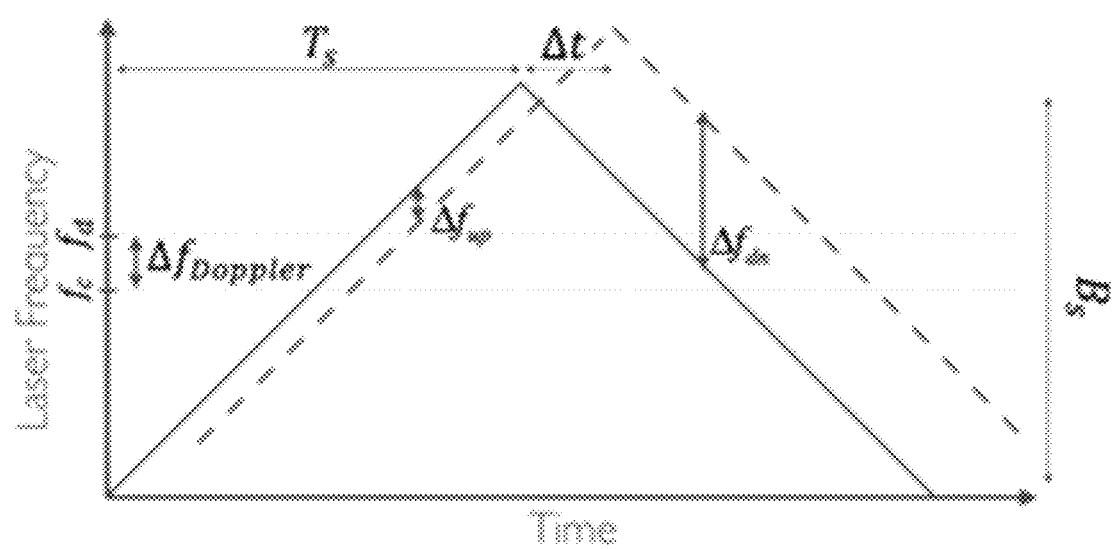
FIG. 3A illustrates a triangle wave frequency modulation and echo signal, according to an example embodiment of the present disclosure.

FIG. 3A illustrates a triangle wave frequency modulation and echo signal, according to an example embodiment of the present disclosure. The FMCW LIDAR systems described in this disclosure modulate the frequency of the laser with a center frequency $f_c$, over a sweep duration $T_s$. The modulation can take any number of possible sweep patterns, such as a sawtooth, or a triangle wave as shown in FIG. 3, which also shows a time-shifted "echo" (signal returned from a target) using the dashed line and delayed by $\Delta t$. The echo has a frequency shift due to the Doppler effect of a moving object. In this case, the Doppler shift $\Delta f_{doppler}$ and the echo create different beat tones on the up-sweep and down-sweep of the triangle wave modulation. These beat frequencies are labeled $\Delta f_{up}$ and $\Delta f_{dn}$, respectively. The range and velocity can be calculated directly from these parameters using equations (1) and (2) below.

$$R = \frac{cT_s}{4B_s}(\Delta f_{up} + \Delta f_{dn}) \quad (1)$$

$$V = \frac{\lambda_c}{4}(\Delta f_{dn} - \Delta f_{up}) \quad (2)$$

In equations (1) and (2) above, $B_S$ is the sweep bandwidth for the modulated signal, and $\lambda_C$ is the center wavelength of that sweep (defined by $c/f_C$).

Figure 3B:
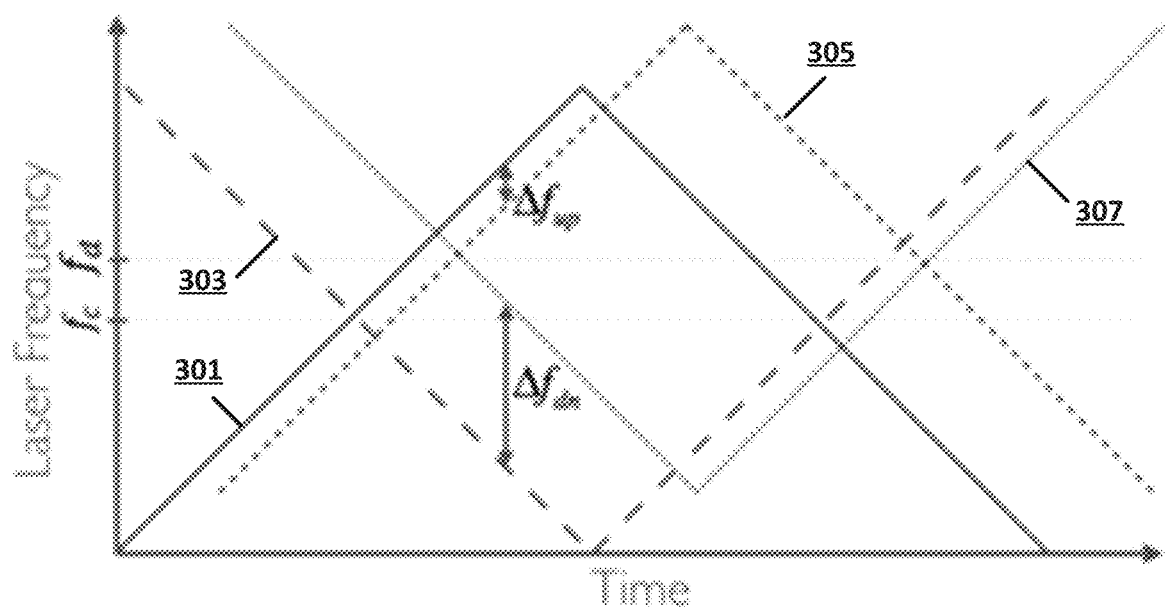
FIG. 3B illustrates a triangle wave frequency modulation and echo signal, as well as a counter-chirped signal, according to an example embodiment of the present disclosure.

FIG. 3B illustrates a triangle wave frequency modulation and echo signal, as well as a counter-chirped signal, according to an example embodiment of the present disclosure. According to some embodiments of the present disclosure, two laser sources can be used and one can modulate the two lasers (potentially at different wavelengths) with different patterns, e.g., the counter-chirp triangle modulation shown in FIG. 3B. In this example, the transmitted lasers are shown as lines 301 and 303, and their respective echoes are shown as lines 305 and 307. This enables real-time range and velocity measurements since $\Delta f_{up}$ and $\Delta f_{dn}$ can be retrieved simultaneously, although reduced SNR in one polarization due to the various material properties of targets can affect measurements. Potential solutions to remedy this problem are discussed later in this disclosure. Although triangle waves have been used in the examples shown in FIGS. 3A and 3B, this application is not limited to such waves, and the frequency modulation pattern for any laser can be different from the other lasers.

Figure 4:
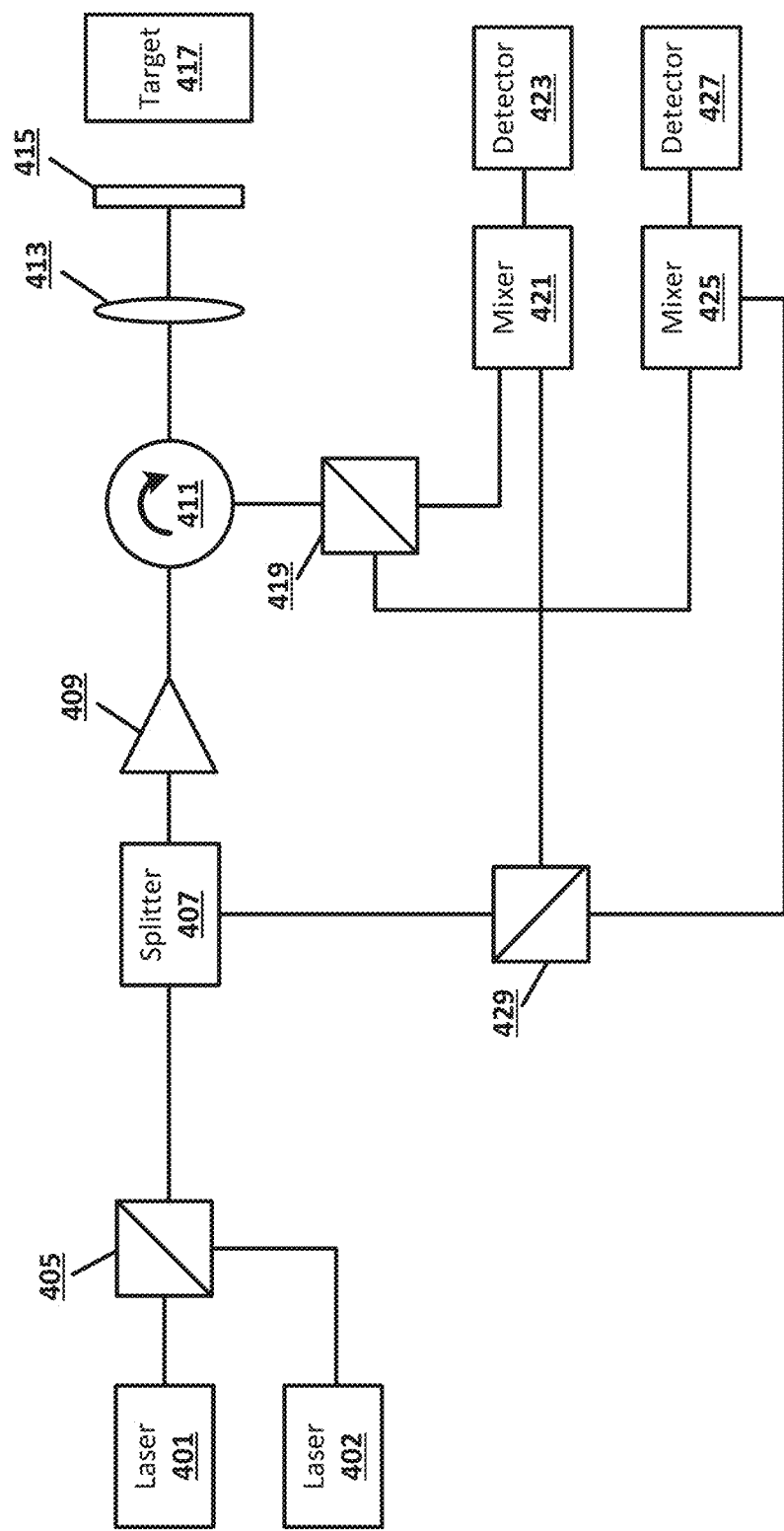
FIG. 4 illustrates another LIDAR system for performing material estimation according to example implementations of the present disclosure.

FIG. 4 illustrates another LIDAR system for performing material estimation according to example implementations of the present disclosure. The LIDAR system includes one or more of each of a number of components, but may include fewer or additional components than shown in FIG. 4. As shown, the LIDAR system includes two laser sources 401, 402 and a first polarizing beam splitter 405. In this example embodiment, the first laser source 401 and the second laser source 402 are both connected to inputs of the first polarizing beam splitter 405 to generate a beam of co-propagating, cross-polarized light. While this example illustrates an embodiment with two laser sources, the application is not limited to two laser sources, and a larger number of light sources can be used in various embodiments. The beam of cross-polarized light is then split into a target path and a local oscillator (LO) path using a beam splitter 407. The target path light can be amplified using an optical amplifier 409, and directed to a target 417 through an optical path discriminator 411. The target path light can be directed to the target 417 through a lens system 413 and a polarization wave plate 415, in some embodiments. The light reflected from the target 417 can then be directed through the optical path discriminator 411 to a second polarizing beam splitter 419. According to some embodiments, the optical path discriminator 411 can be a circulator or a beam splitter. In this example embodiment, the LO path light is transmitted from the beam splitter 407 to a third polarizing beam splitter 429. The second polarizing beam splitter 419 and the third polarizing beam splitter 429 are both configured to transmit light to the first mixer 421 and the second mixer 425.

In this example embodiment, two laser sources 401, 402 are used, and therefore the appropriate polarization should be routed to the final mixers 421, 425 in order to maximize the mixing efficiency. Because dissimilar lasers do not mix well, note that the beams that are mixed at the first mixer 421 and the second mixer 425 are from opposite ports of the second polarizing beam splitter 419 and the third polarizing beam splitter 429. This is due to the s-polarization to p-polarization rotation process (and vice versa) that occurs when passing a linear polarization through the polarization wave plate 415, off a target, and back through the polarization wave plate 415.

In this example embodiment, the first mixer 421 and second mixer 425 are single-ended and each connects to the first detector 423 and the second detector 427, respectively.

However, the first and second mixers 421, 425 could have two or more outputs according to other embodiments. In some embodiments, the first and second mixers 421, 425 do not mix light equally from the LO path and the target path, but instead bias light coming from the target path. For example, the first and second mixers 421, 425 can bias light output to the first and second detectors 423, 427 at a ratio of 80/20, 90/10, or 99/1 in favor of the target path light, in some embodiments. This biasing of the light from the target path can increase the detection of the target path light, which may result in a more accurate detection of the target.

Figure 5:
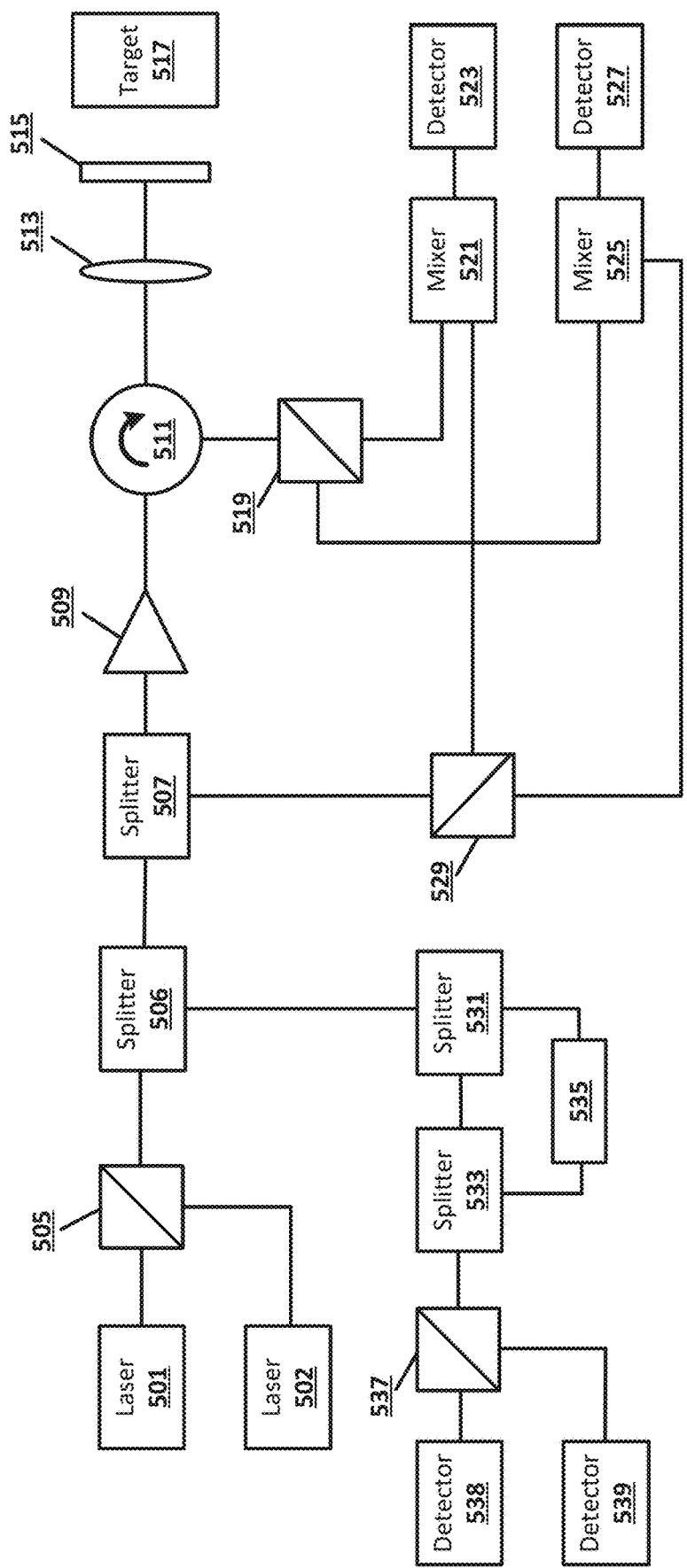
FIG. 5 illustrates another LIDAR system for performing material estimation according to example implementations of the present disclosure.

FIG. 5 illustrates another LIDAR system for performing material estimation according to example implementations of the present disclosure. The LIDAR system includes one or more of each of a number of components, but may include fewer or additional components than shown in FIG. 5. Similar to the embodiment shown above in FIG. 4, the LIDAR system includes two laser sources 501, 502 and a first polarizing beam splitter 505. In this example embodiment, the first laser source 501 and the second laser source 502 are both connected to inputs of the first polarizing beam splitter 505 to generate a beam of co-propagating, cross-polarized light. In this example embodiment, a supplemental optical circuit is included that can be used to create a signal reference. This reference circuit includes a first beam splitter 506 that can split the cross-polarized beam of light and direct a portion of the light to a second splitter 531, an optical delay line 535, a third beam splitter 533, a fourth polarizing beam splitter 537, and two reference detectors 538, 539. This reference signal can be tracked using the reference detectors 538, 539 and subsequently used to compensate for perturbations in the laser sources and to calibrate the system's performance. This reference circuit can be added to any of the other embodiments described in this disclosure.

The beam of cross-polarized light is also split into a target path and a local oscillator (LO) path using a fourth beam splitter 507. The target path light can be amplified using an optical amplifier 509, and directed to a target 517 through an optical path discriminator 511. The target path light can be directed to the target 517 through a lens system 513 and a polarization wave plate 515, in some embodiments. The light reflected from the target 517 can then be directed through the optical path discriminator 511 to a second polarizing beam splitter 519. According to some embodiments, the optical path discriminator 511 can be a circulator or a beam splitter. In this example embodiment, the LO path light is transmitted from the fourth beam splitter 507 to a third polarizing beam splitter 529. The second polarizing beam splitter 519 and the third polarizing beam splitter 529 are both configured to transmit light to the first mixer 521 and the second mixer 525.

In this example embodiment, two laser sources 501, 502 are used, and therefore the appropriate polarization should be routed to the final mixers 521, 525 in order to maximize the mixing efficiency. Because dissimilar lasers do not mix well, the beams that are mixed at the first mixer 521 and the second mixer 525 are from opposite ports of the second polarizing beam splitter 519 and the third polarizing beam splitter 529. This is due to the s-polarization to p-polarization rotation process (and vice versa) that occurs when passing a linear polarization through the polarization wave plate 515, off a target 517, and back through the polarization wave plate 515.

In this example embodiment, the first mixer 521 and second mixer 525 are single-ended and each connects to the first detector 523 and the second detector 527, respectively. However, the first and second mixers 521, 525 could have two or more outputs according to other embodiments. In some embodiments, the first and second mixers 521, 525 do not mix light equally from the LO path and the target path, but instead bias light coming from the target path. For example, the first and second mixers 521, 525 can bias light output to the first and second detectors 523, 527 at a ratio of 80/20, 90/10, or 99/1 in favor of the target path light, in some embodiments. This biasing of the light from the target path can increase the detection of the target path light, which may result in a more accurate detection of the target.

Figure 6:
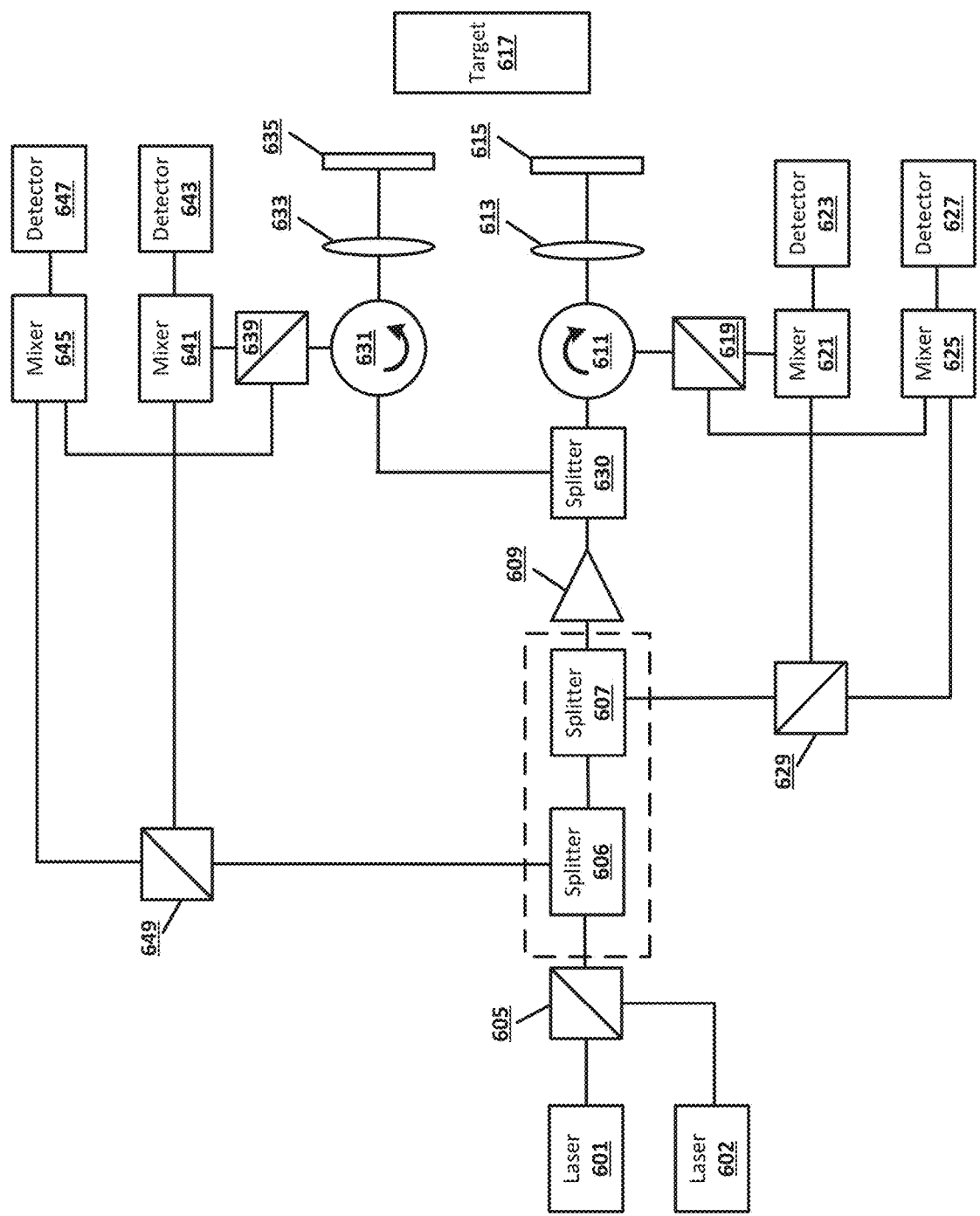
FIG. 6 illustrates another LIDAR system for performing material estimation according to example implementations of the present disclosure.

FIG. 6 illustrates another LIDAR system for performing material estimation according to example implementations of the present disclosure. The LIDAR system includes one or more of each of a number of components, but may include fewer or additional components than shown in FIG. 6. This example embodiment shows a two-laser design of a polarization-enhanced LIDAR system where two beams are sent to a target 617. For simplicity, only two beams are shown in this example, but there are fundamentally no restrictions to the number of beams that can be sent to a target, and the system can be scaled up or down according to each embodiment. As shown, the LIDAR system includes two laser sources 601, 602 and a first polarizing beam splitter 605. In this example embodiment, the first laser source 601 and the second laser source 602 are both connected to inputs of the first polarizing beam splitter 605 to generate a beam of co-propagating, cross-polarized light. Increasing the number of beams requires increasing the number of splitters used, or the number of outputs from each splitter that bookend the optical amplifier 609.

In this example embodiment, the beam of cross-polarized light is split into two LO paths using a first splitter 606 and a second splitter 607 ahead of the optical amplifier 609. In an alternative embodiment, the first and second splitters 606, 607 can be combined into a different type of splitter, such as a 1×3 splitter, or an active switch in some embodiments. This substitution or combination can simplify the system. The target path light is directed from the optical amplifier 609 to a third splitter 630, which divides the light into two target paths. Each target path can be directed to the target 617 through a first optical path discriminator 611 or a second optical path discriminator 631. The first target path light can be directed to the target 617 through a first lens system 613 and a first polarization wave plate 615, while the second target path light is directed to through a second lens system 633 and a second polarization wave plate 635. The first beam of light reflected from the target 617 can then be directed through the first optical path discriminator 611 to a second polarizing beam splitter 619, while the second beam of light reflected from the target 617 can be directed through the second optical path discriminator 631 to a fourth polarizing beam splitter 639. According to some embodiments, the optical path discriminators 611, 631 can be circulators or beam splitters.

In this example embodiment, the first LO path light is transmitted from the first beam splitter 606 to a fifth polarizing beam splitter 649, while the second LO path light is transmitted from the second beam splitter 607 to a third polarizing beam splitter 629. The second polarizing beam splitter 619 and the third polarizing beam splitter 629 are both configured to transmit light to the first mixer 621 and the second mixer 625. Similarly, the fourth polarizing beam splitter 639 and the fifth polarizing beam splitter 649 are both configured to transmit light to the third mixer 645 and the fourth mixer 641.

In this example embodiment, two laser sources 601, 602 are used, and therefore the appropriate polarization should be routed to the final mixers 621, 625, 641, 645 in order to maximize the mixing efficiency. Because dissimilar lasers do not mix well, note that the beams that are mixed at the first mixer 621 and the second mixer 625 are from opposite ports of the second polarizing beam splitter 619 and the third polarizing beam splitter 629. Similarly, the beams mixed at the third mixer 641 and the fourth mixer 645 are from opposite ports of the fourth polarizing beam splitter 639 and the fifth polarizing beam splitter 649. This is due to the s-polarization to p-polarization rotation process (and vice versa) that occurs when passing a linear polarization through the polarization wave plates 615, 635 off a target 617, and back through the polarization wave plates 615, 635. In this example embodiment, the first mixer 621, second mixer 625, third mixer 641, and fourth mixer 645 are single-ended and each connects to the first detector 623, second detector 627, third detector 643, and fourth detector 647, respectively.

Figure 7:
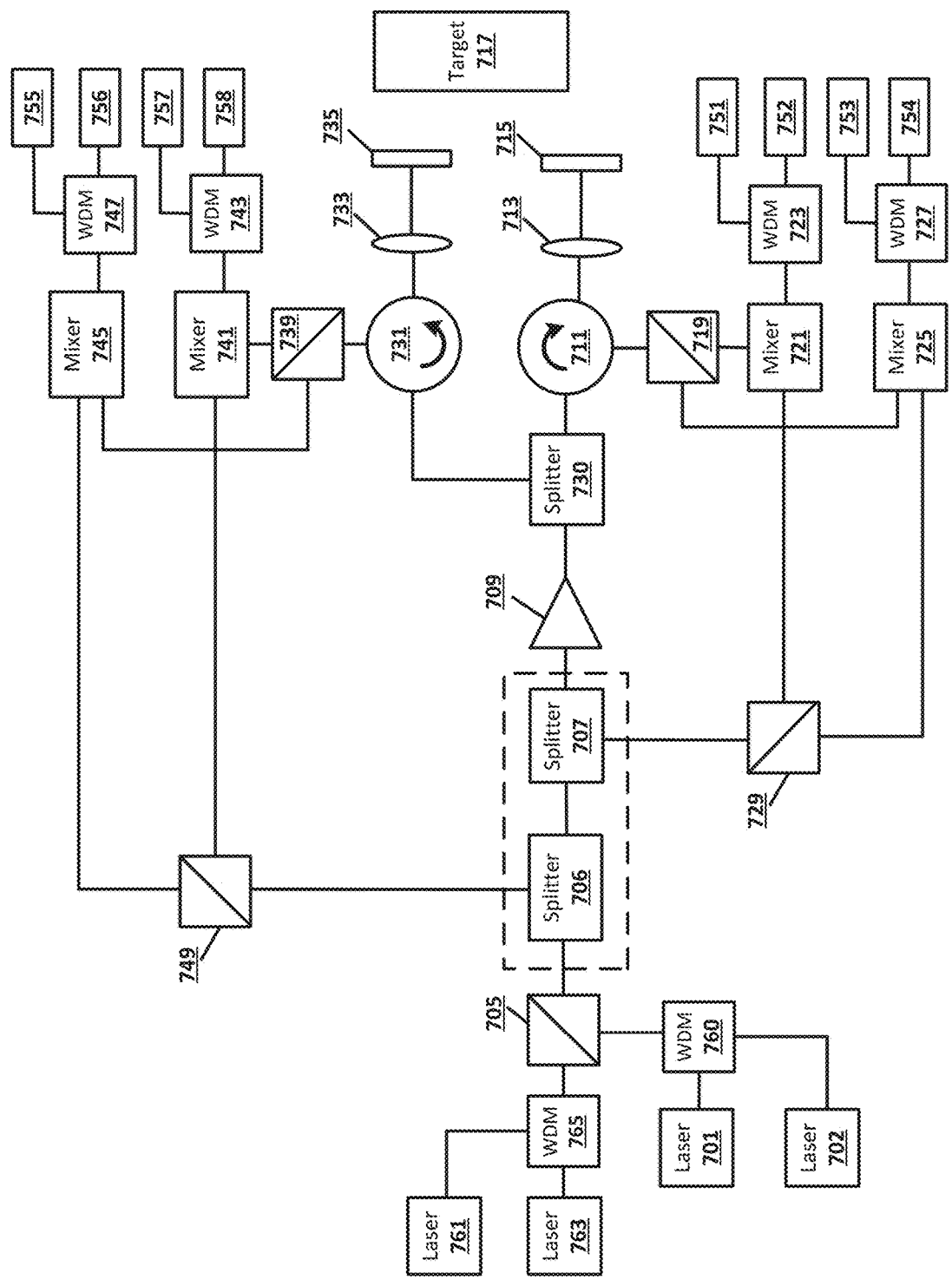
FIG. 7 illustrates another LIDAR system for performing material estimation according to example implementations of the present disclosure.

FIG. 7 illustrates another LIDAR system for performing material estimation according to example implementations of the present disclosure. Specifically, FIG. 7 shows an example of a multiple laser multi-beam embodiment of a polarization enhanced LIDAR system. The LIDAR system includes one or more of each of a number of components, but may include fewer or additional components than shown in FIG. 7.

As shown, the LIDAR system includes four laser sources 761, 763, 701, 702 and first and second wavelength division multiplexers (WDM) 765, 760. The system uses two wavelengths for each polarization, with lasers 761 and 763 having p-polarization and lasers 701 and 702 having s-polarization. In this fashion, one can counter-chirp the two lasers to obtain real-time range and velocity measurements in addition to real-time material estimation information due to the variable response in polarization. One skilled in the art will realize that WDMs are not required to combine lasers into a single spatial mode if another optical degree of freedom is used for distinguishing between the lasers. Although two WDMs are shown in this example, the present disclosure is not limited to two colors. Any number of colors can be used in the various embodiments of this disclosure.

In this example embodiment the first and second WDMs are connected to the inputs of a first polarizing beam splitter 705 to generate the initial beam, and this beam is split into two LO paths using a first splitter 706 and a second splitter 707 ahead of the optical amplifier 709. In an alternative embodiment, the first and second splitters 706, 707 can be combined into a different type of splitter, such as a 1×3 splitter, or an active switch in some embodiments. The target path light is directed from the optical amplifier 709 to a third splitter 730, that divides the light into two target paths. Each target path can be directed to the target 717 through a first optical path discriminator 711 or a second optical path discriminator 731. The first target path light can be directed to the target 717 through a first lens system 713 and a first polarization wave plate 715, while the second target path light is directed to through a second lens system 733 and a second polarization wave plate 735. The first beam of light reflected from the target 717 can then be directed through the first optical path discriminator 711 to a second polarizing beam splitter 719, while the second beam of light reflected from the target 717 can be directed through the second optical path discriminator 731 to a fourth polarizing beam splitter 739. According to some embodiments, the optical path discriminators 711, 731 can be circulators or beam splitters. In an additional embodiment, a variable polarization rotator (VPR) can be introduced after the second beam splitter 707. A single VPR (not shown) could be introduced before the third splitter 730, in some embodiments, while in other embodiments two (or more) VPRs may be introduced after the third splitter 730.

In this example embodiment, the first LO path light is transmitted from the first beam splitter 706 to a fifth polarizing beam splitter 749, while the second LO path light is transmitted from the second beam splitter 707 to a third polarizing beam splitter 729. The second polarizing beam splitter 719 and the third polarizing beam splitter 729 are both configured to transmit light to the first mixer 721 and the second mixer 725. Similarly, the fourth polarizing beam splitter 739 and the fifth polarizing beam splitter 749 are both configured to transmit light to the third mixer 741 and the fourth mixer 745.

In this example embodiment, because multiple laser sources are used the appropriate polarization should be routed to the final mixers 721, 725, 741, 745 in order to maximize the mixing efficiency. Because dissimilar lasers do not mix well, note that the beams that are mixed at the first mixer 721 and the second mixer 725 are from opposite ports of the second polarizing beam splitter 719 and the third polarizing beam splitter 729. Similarly, the beams mixed at the third mixer 741 and the fourth mixer 745 are from opposite ports of the fourth polarizing beam splitter 739 and the fifth polarizing beam splitter 749. This is due to the s-polarization to p-polarization rotation process (and vice versa) that occurs when passing a linear polarization through the polarization wave plates 715, 735 off a target 717, and back through the polarization wave plates 715, 735. In this example embodiment, the first mixer 721 directs mixed light to a third WDM 723, which separates the light by wavelength and directs it to the first and second detectors 751, 752. Likewise, the second mixer directs mixed light to a fourth WDM 727, which separates the light by wavelength and directs it to the third and fourth detectors 753, 754; the third mixer 741 directs mixed light to a fifth WDM 743, which separates the light by wavelength and directs it to the fifth and sixth detectors 757, 758; and the fourth mixer 745 directs mixed light to a sixth WDM 747, which separates the light by wavelength and directs it to the seventh and eighth detectors 755, 756.

Figure 8:
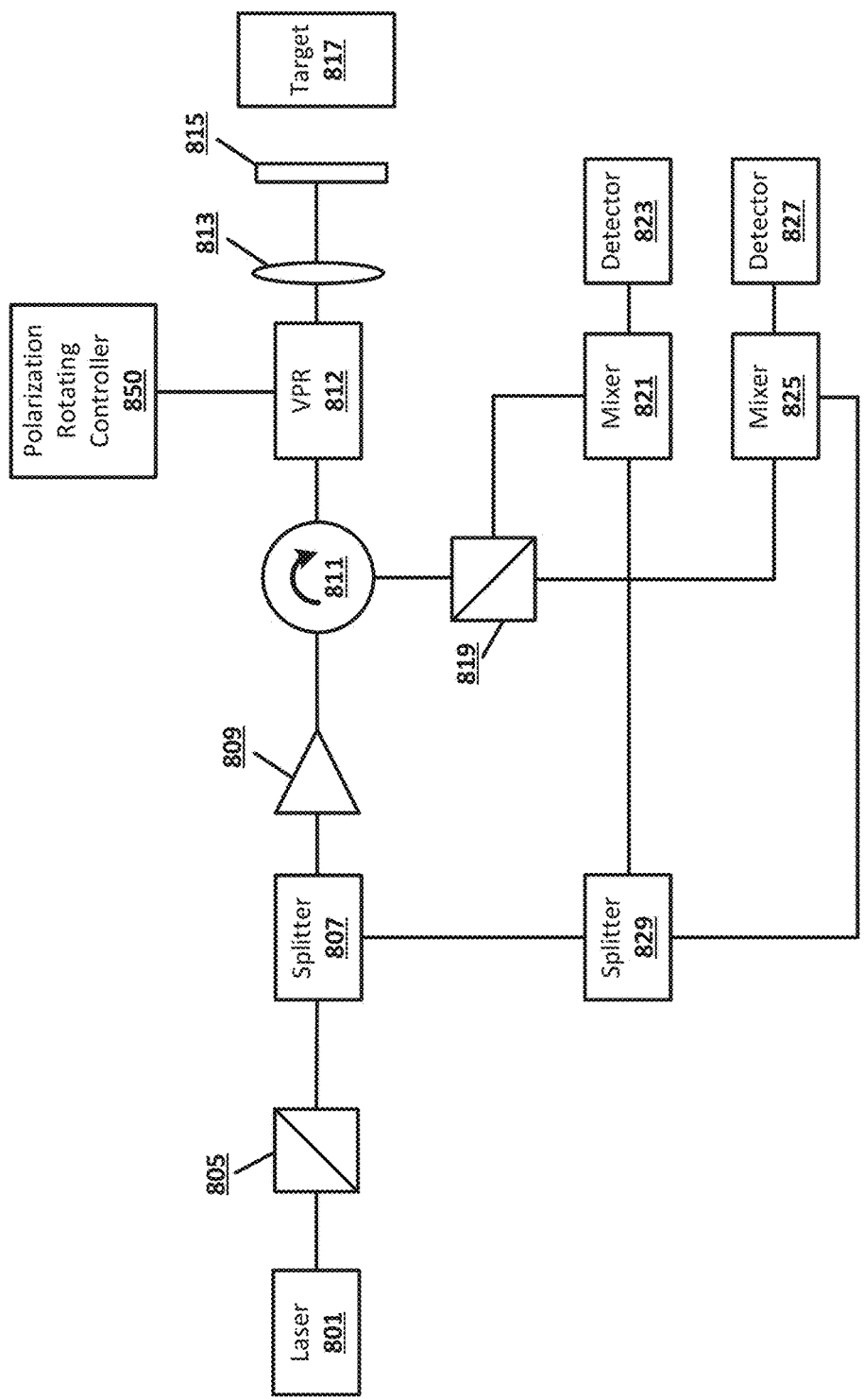
FIG. 8 illustrates a LIDAR system for performing speckle reduction or material estimation according to example implementations of the present disclosure.

FIG. 8 illustrates a LIDAR system for performing speckle reduction according to example implementations of the present disclosure. The LIDAR system includes one or more of each of a number of components, but may include fewer or additional components than shown in FIG. 8. This example embodiment shows an optical circuit that can remove the need for dual-axis components by using a single laser 801 and a polarizing beam splitter 805 at the source, and adding a variable polarization rotator (VPR) 812 to achieve speckle reduction. The beam of polarized light is then split into a target path and a local oscillator (LO) path using a first beam splitter 807. The target path light can be amplified using an optical amplifier 809, and directed to a target 817 through an optical path discriminator 811. The target path light can be directed to the target 817 through the variable polarization rotator 812, a lens system 813, and a polarization wave plate 815, in some embodiments. The light reflected from the target 817 can then be directed through the optical path discriminator 811 to a second polarizing beam splitter 819. In this example embodiment, the LO path light is transmitted from the first beam splitter 807 to a second beam splitter 829. The second polarizing beam splitter 819 and the second beam splitter 829 are both configured to transmit light to the first mixer 821 and the second mixer 825. In this example embodiment, the first mixer 821 and second mixer 825 are single-ended and each connects to the first detector 823 and the second detector 827, respectively. However, the first and second mixers 821, 825 could have two or more outputs according to other embodiments.

The VPR 812 can be controlled, in some embodiments, using a polarization rotating controller 850 that is configured to toggle the VPR 812 between two settings: one setting that performs no rotation, allowing p-polarization to stay p-polarized; and a second setting that performs, for example, a 90° rotation converting a p-polarized light to s-polarization. With this circuit design, the second splitter 829 can be a 2×2 splitter rather than a polarizing beam splitter, since all of the light propagating through it is co-polarized, and the second polarizing beam splitter 819 converts the cross-polarized light from the optical path discriminator 811 to co-polarized light on both waveguides leading to the mixers 821, 825 before the respective detectors 823, 827. In exemplary embodiments, the polarization rotating controller 850 can achieve speckle reduction by controlling the operation of the VPR 812 to transform the polarization state of the target path light at a rate faster than the rate of sampling by the detectors 823, 827.

According to various embodiments, the VPR 812 can be placed before or after the optical path discriminator 811, although placement before requires a dual-axis optical path discriminator 811. Similarly, it can be placed before the optical amplifier 809, but again it requires a dual-axis amplifier which can lead to crosstalk and increased noise. In some embodiments, the first polarizing beam splitter 805 can be omitted if the laser source 801 generates a polarized beam.

Figure 9:
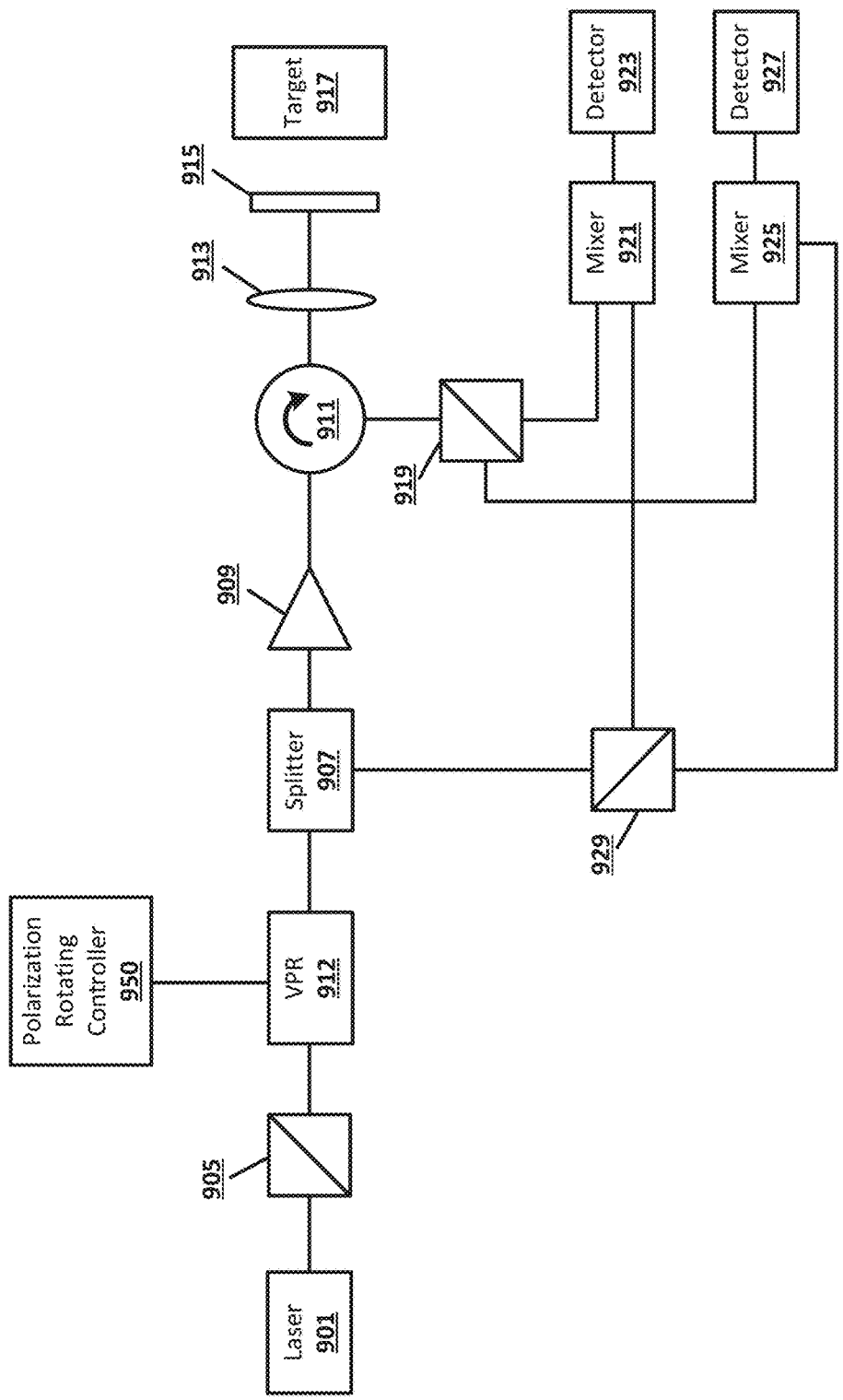
FIG. 9 illustrates another LIDAR system for performing speckle reduction or material estimation according to example implementations of the present disclosure.

FIG. 9 illustrates another LIDAR system for performing speckle reduction according to example implementations of the present disclosure. The LIDAR system includes one or more of each of a number of components, but may include fewer or additional components than shown in FIG. 9. This example embodiment shows an optical circuit where the VPR 912 is moved ahead of a first beam splitter 907 and reintroduces a third polarizing beam splitter 929 for the LO path. The beam of polarized light generated by the laser source 901 and the first polarizing beam splitter 905 is split into a target path and a LO path using a first beam splitter 907. The target path light can be amplified using an optical amplifier 909, and directed to a target 917 through an optical path discriminator 911. The target path light can be directed to the target 917 through a lens system 913 and a polarization wave plate 915, in some embodiments. The light reflected from the target 917 can then be directed through the optical path discriminator 911 to a second polarizing beam splitter 919. The second polarizing beam splitter 919 and the third polarizing beam splitter 929 are both configured to transmit light to the first mixer 921 and the second mixer 925. In this example embodiment, the first mixer 921 and second mixer 925 are single-ended and each connects to the first detector 923 and the second detector 927, respectively. However, the first and second mixers 921, 925 could have two or more outputs according to other embodiments.

The VPR 912 can be controlled, in some embodiments, using a polarization rotating controller 950 that is configured to toggle the VPR 912 between two settings: one setting that performs no rotation, allowing p-polarization to stay p-polarized; and a second setting that performs, for example, a 90° rotation converting a p-polarized light to s-polarization. This design can potentially be very useful if one uses the VPR 912 to rapidly scramble (i.e. at a rate faster than the rate of sampling by the detectors 923, 927) between various orthogonal pairs of polarizations. The rapid "scrambling" of the polarization should mitigate SNR fluctuation due to speckle effects. Meanwhile, the use of orthogonal polarizations enables the material estimation.

Figure 10:
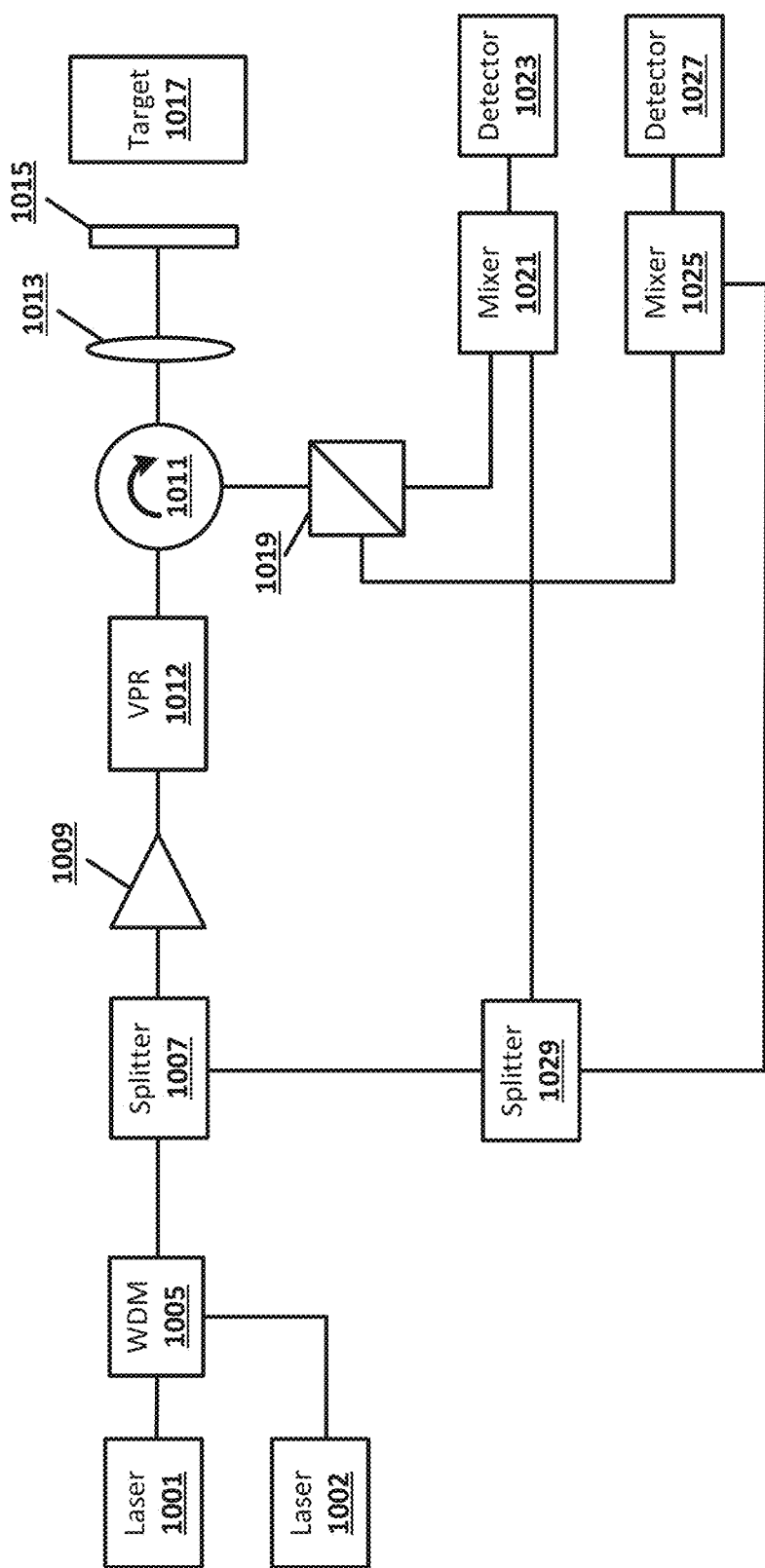
FIG. 10 illustrates another LIDAR system for performing speckle reduction or material estimation according to example implementations of the present disclosure.

FIG. 10 illustrates another LIDAR system for performing speckle reduction according to example implementations of the present disclosure. The LIDAR system includes one or more of each of a number of components, but may include fewer or additional components than shown in FIG. 10. This example embodiment shows an optical circuit that is a two-laser variant of the embodiment described above in reference to FIG. 8. Specifically, the system includes a first laser source 1001 and second laser source 1002 that are connected to inputs of a WDM 1005 to combine the two lasers if they have dissimilar wavelengths. If two similar wavelengths are used, one can use any modal combiner (such as a 2×2 splitter) to spatially couple the two lasers. The beam of light from the WDM 1005 is split into a target path and a LO path using a first beam splitter 1007. The target path light can be amplified using an optical amplifier 1009, and directed to a VPR 1012 ahead of an optical path discriminator 1011. The target path light can be directed to the target 1017 through a lens system 1013 and a polarization wave plate 1015, in some embodiments, and the light reflected from the target 1017 can then be directed through the optical path discriminator 1011 to a polarizing beam splitter 1019. In this example embodiment, the LO path light is transmitted from the first beam splitter 1007 to a second beam splitter 1029. The polarizing beam splitter 1019 and the second beam splitter 1029 are both configured to transmit light to the first mixer 1021 and the second mixer 1025. In this example embodiment, the first mixer 1021 and second mixer 1025 are single-ended and each connects to the first detector 1023 and the second detector 1027, respectively. In this particular embodiment, the VPR 1012 is placed before the optical path discriminator 1011, and therefore a dual-axis optical path discriminator 1011 is used. As discussed above in reference to FIG. 7, the use of a WDM 1005 allows a counter-chirp to be used with the two lasers to obtain real-time range and velocity measurements in this particular embodiment.

Figure 11:
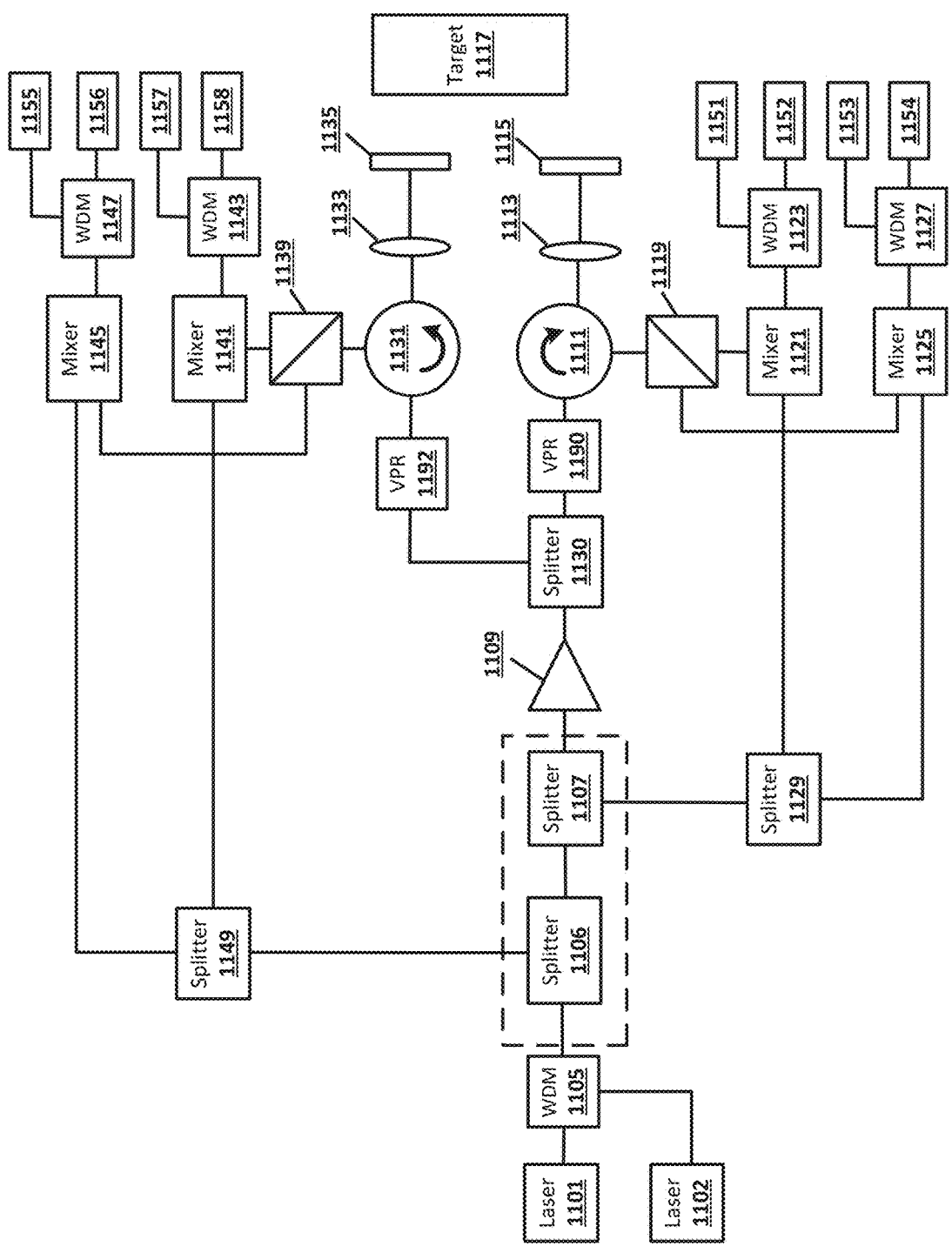
FIG. 11 illustrates a LIDAR system for performing speckle reduction and material estimation according to example implementations of the present disclosure.

FIG. 11 illustrates a LIDAR system for performing material estimation and speckle reduction according to example implementations of the present disclosure. Specifically, FIG. 11 shows an example of a multi-beam VPR-based LIDAR system for material estimation and speckle reduction. The LIDAR system includes one or more of each of a number of components, but may include fewer or additional components than shown in FIG. 11. As shown, the LIDAR system includes two laser sources 1101 and 1102 that are combined using a WDM 1105. The use of a WDM 1105 allows a counter-chirp to be used with the two lasers to obtain real-time range and velocity measurements in this particular embodiment. In an alternative embodiment, the LIDAR system illustrated in FIG. 11 can be implemented with four laser sources and a first and second WDM, similar to the embodiment described above in reference to FIG. 7.

In this example embodiment, the beam from the WDM 1105 is split into two LO paths using a first splitter 1106 and a second splitter 1107 ahead of the optical amplifier 1109. In an alternative embodiment, the first and second splitters 1106, 1107 can be combined into a different type of splitter, such as a 1×3 splitter, or an active switch in some embodiments. The target path light is directed from the optical amplifier 1109 to a third splitter 1130, that divides the light into two target paths. Each target path can be directed to a respective VPR 1190, 1192. After passing through the first VPR 1190 and the second VPR 1192, the target path light can be directed to the target 1117 through a first optical path discriminator 1111 or a second optical path discriminator 1131. The first target path light can be directed to the target 1117 through a first lens system 1113 and a first polarization wave plate 1115, while the second target path light is directed through a second lens system 1133 and a second polarization wave plate 1135. The first beam of light reflected from the target 1117 can then be directed through the first optical path discriminator 1111 to a first polarizing beam splitter 1119, while the second beam of light reflected from the target 1117 can be directed through the second optical path discriminator 1131 to a second polarizing beam splitter 1139. According to some embodiments, the optical path discriminators 1111, 1131 can be circulators or beam splitters.

In this example embodiment, the first LO path light is transmitted from the first beam splitter 1106 to a fifth beam splitter 1149, while the second LO path light is transmitted from the second beam splitter 1107 to a fourth beam splitter 1129. The first polarizing beam splitter 1119 and the fourth beam splitter 1129 are both configured to transmit light to the first mixer 1121 and the second mixer 1125. Similarly, the second polarizing beam splitter 1139 and the fifth beam splitter 1149 are both configured to transmit light to the third mixer 1145 and the fourth mixer 1141.

In this example embodiment, the first mixer 1121 directs mixed light to a second WDM 1123, which separates the light by wavelength and directs it to the first and second detectors 1151, 1152. Likewise, the second mixer 1125 directs mixed light to a third WDM 1127, which separates the light by wavelength and directs it to the third and fourth detectors 1153, 1154; the third mixer 1141 directs mixed light to a fourth WDM 1143, which separates the light by wavelength and directs it to the fifth and sixth detectors 1157, 1158; and the fourth mixer 1145 directs mixed light to a fifth WDM 1147, which separates the light by wavelength and directs it to the seventh and eighth detectors 1155, 1156.

Figure 12:
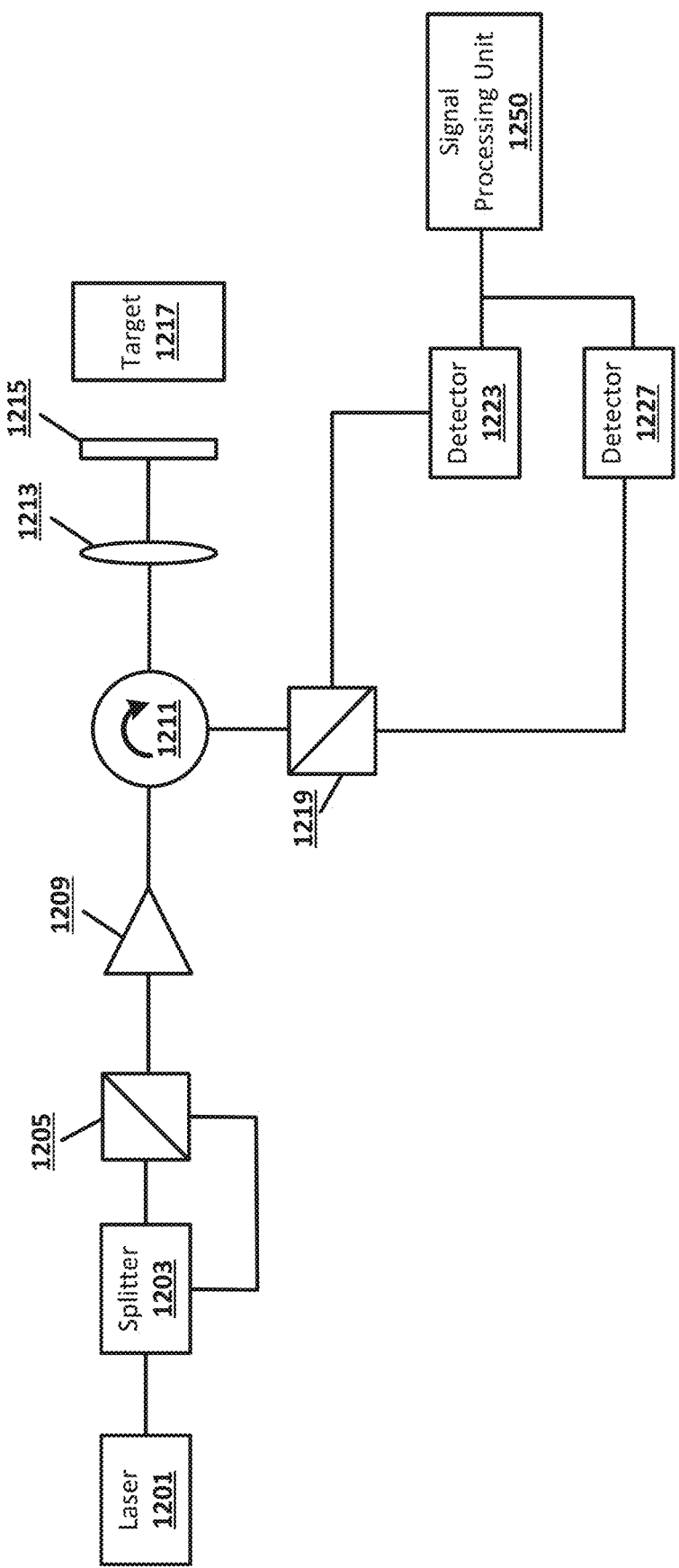
FIG. 12 illustrates a LIDAR system for performing speckle reduction or material estimation according to example implementations of the present disclosure.

FIG. 12 illustrates a LIDAR system according to example implementations of the present disclosure. The LIDAR system includes one or more of each of a number of components, but may include fewer or additional components than shown in FIG. 12. As shown, the LIDAR system includes a laser source 1201, a first beam splitter 1203, and a first polarizing beam splitter 1205. In this example embodiment, a single laser source 1201 is split using the first beam splitter 1203, and then recombined using the first polarizing beam splitter 1205 to generate a beam of co-propagating, cross-polarized light. The light can then be amplified using an optical amplifier 1209, and directed to a target 1217 through an optical path discriminator 1211. The target path light can be directed to the target 1217 through a lens system 1213 and a polarization wave plate 1215. In some embodiments, the polarization wave plate 1215 (or some other element within the system) can reflect a portion of the light that is slightly offset, or ahead of, the light that exits the system, enters the target environment, and is reflected from the target 1217. This internal reflection can be created by any waveguide-to-air interface (including a fiber-to-air interface), or a calibrated reflected optic in the path (including a lens, window, retroreflector, or partial mirror). Both the light reflected from the polarization wave plate 1215 and the light reflected from the target can be directed through the optical path discriminator 1211 to a second polarizing beam splitter 1219.

According to some embodiments, the optical path discriminator 1211 can be a circulator or a beam splitter. The polarizing beam splitter 1219 then directs the light to detectors 1223 and 1227, which are in communication with a signal processing unit 1250 configured to analyze signals from the detectors. In such an embodiment, a mixer, such as the mixers 221, 225 discussed above in reference to FIG. 2, is not required. The signal processing unit 1250 can compare the intensities of the signals from the first detector 1223 and the second detector 1227 and provide insights into the target material reflectivity, surface quality, or orientation. According to some embodiments, a variable polarization rotator can also be included within the system in order to transform the polarization state of the beam of polarized light, as discussed herein.

Figure 13:
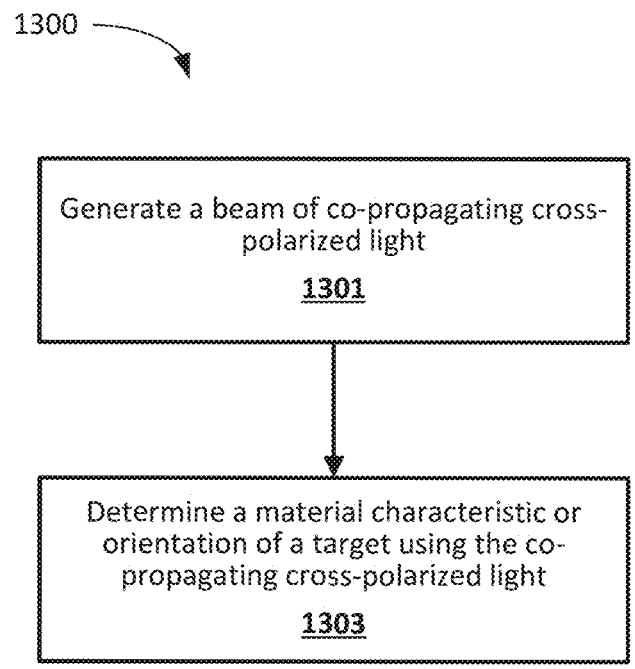
FIG. 13 depicts a flow diagram of a method for performing material estimation using polarized light in accordance with example implementations of the present disclosure.

FIG. 13 illustrates flow chart of an example method 1300 for performing material estimation using polarized light in accordance with example implementations of the present disclosure. In embodiments, various portions of method 1300 may be performed by LIDAR systems of FIGS. 1, 2, and 4-12. With reference to FIG. 13, method 1300 illustrates example functions used by various embodiments. Although specific function blocks ("blocks") are disclosed in method 1300, such blocks are examples. That is, embodiments are well suited to performing various other blocks or variations of the blocks recited in method 1300. It is appreciated that the blocks in method 1300 may be performed in an order different than presented, and that not all of the blocks in method 1300 may be performed.

At block 1301, a beam of co-propagating, cross-polarized light is generated. In some embodiments, the co-propagating, cross-polarized light is generated using a polarizing beam splitter and a single laser source, while in other embodiments multiple laser sources can be used. In some embodiments, the multiple laser beams may have different wavelengths. The generated beam may be transmitted to a target, and reflected light from the target can be detected at a number of detectors.

At block 1303, a material characteristic or orientation of the target is determined using the co-propagating, cross-polarized light. In one example embodiment, different polarizations of the cross-polarized light may be reflected from the target based on certain characteristics of the target. For example, an ice patch on a road may largely reflect light only in one polarization parallel to the horizon, such that there is a large amount of light detected polarized parallel to the horizon but not much light detected polarized perpendicular to the horizon. If this is the case, the reflectivity or orientation of the target i.e. the patch of ice, can be determined. A similar phenomenon can also occur with windows on a building that are highly reflective in one polarization.

Figure 14:
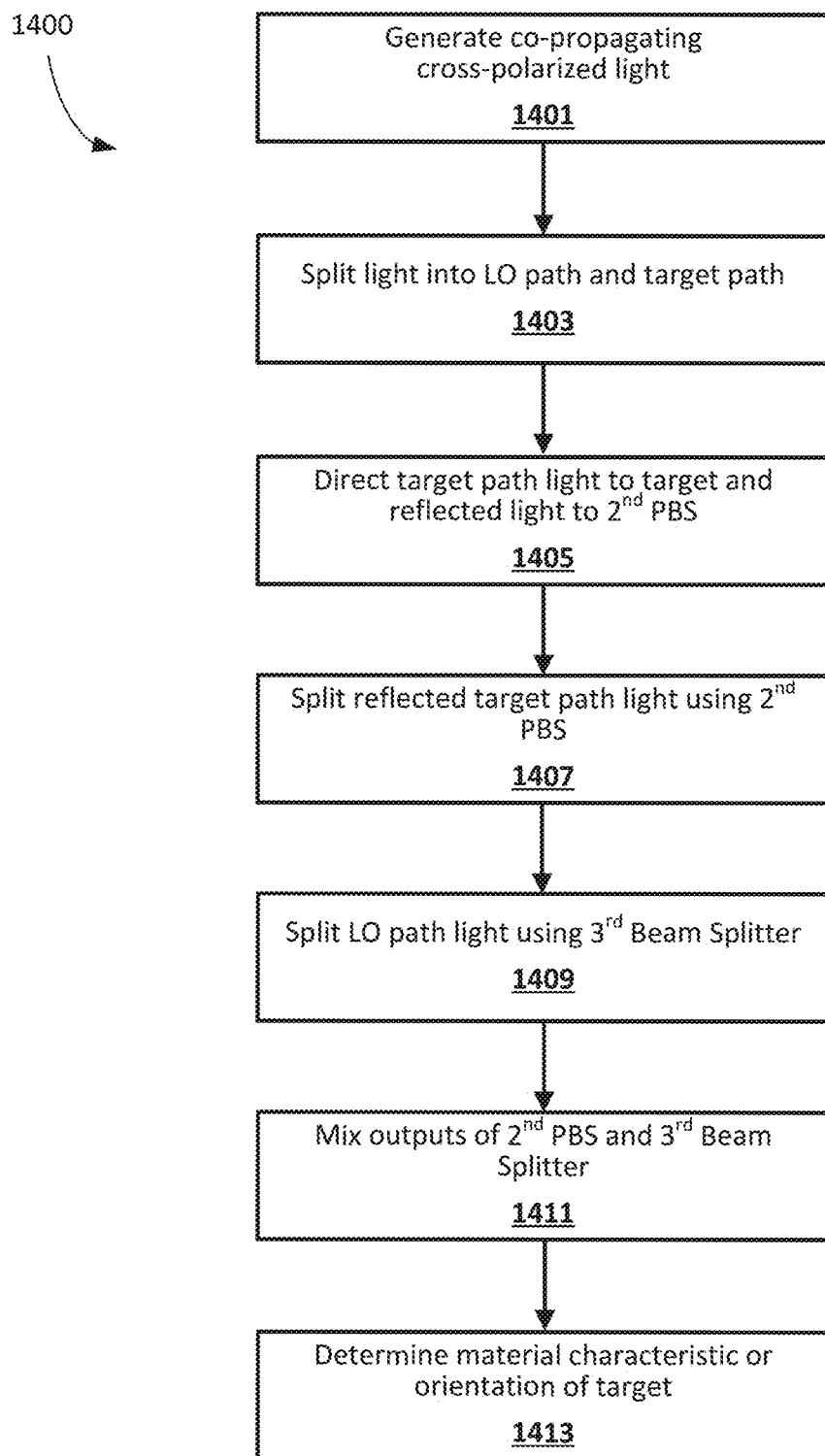
FIG. 14 depicts a flow diagram of another method for performing material estimation using polarized light in accordance with example implementations of the present disclosure.

FIG. 14 depicts a flow diagram of another method 1400 for performing material estimation using polarized light in accordance with example implementations of the present disclosure. In embodiments, various portions of method 1400 may be performed by LIDAR systems of FIGS. 1, 2, and 4-12. With reference to FIG. 14, method 1400 illustrates example functions used by various embodiments. Although specific function blocks ("blocks") are disclosed in method 1400, such blocks are examples. That is, embodiments are well suited to performing various other blocks or variations of the blocks recited in method 1400. It is appreciated that the blocks in method 1400 may be performed in an order different than presented, and that not all of the blocks in method 1400 may be performed.

At block 1401, a beam of co-propagating, cross-polarized light is generated. In some embodiments, the co-propagating, cross-polarized light is generated using a polarizing beam splitter and a single laser source, while in other embodiments multiple laser sources can be used. In some embodiments, the multiple laser beams may have different wavelengths. The generated beam may be transmitted to a target, and reflected light from the target can be detected at a number of detectors. In some embodiments, two or more laser sources can be used to generate a beam with different frequency patterns. In other embodiments, a WDM may be used to combine light with different wavelengths from two or more laser sources.

At block 1403, the beam of co-propagating, cross-polarized light is split into a LO path and a target path. This can be done, for example, using a beam splitter. At block 1405, the target path light is directed to the target using an optical path discriminator, and light reflected from the target is directed to a second polarizing beam splitter. At block 1407, the second polarizing beam splitter splits light reflected from the target and directs it to at least two mixers. At block 1409, the LO path light is split into two portions and also directed to the mixers.

At block 1411 the outputs from the second polarizing beam splitter and the third polarizing beam splitter are mixed using the mixers. In some embodiments, where a single laser source is used to generate the beam of co-propagating, cross-polarized light, the reflected outputs from the second and third polarizing beam splitters are combined using a first mixer, and the transmitted outputs from the second and third polarizing beam splitters are combined using a second mixer. In other embodiments, where two or more laser sources are used to generate the beam of co-propagating, cross-polarized light, the transmitted output from the second polarizing beam splitter is combined with the reflected output of the third polarizing beam splitter at the first mixer, while the reflected output from the second polarizing beam splitter is combined with the transmitted output of the third polarizing beam splitter at the second mixer. The first and second mixers are in communication with a first and second detectors, and combined light from the first mixer is received at the first detector and combined light from the second mixer is received at the second detector.

At block 1413, a material characteristic or orientation of the target is determined based on a comparison of a SNR between signals from a first and second detector. As discussed above, in some cases the mixers can bias light to the detectors in favor of the target path. As discussed above, a comparison of the SNR between signals from the detectors can indicate the reflectivity or orientation of the target.

Figure 15:
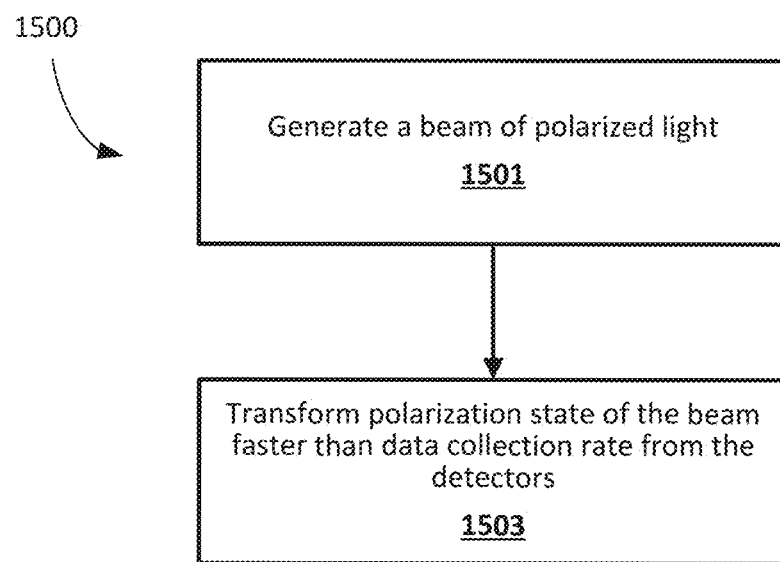
FIG. 15 depicts a flow diagram of a method for performing speckle reduction using polarized light in accordance with example implementations of the present disclosure.

FIG. 15 depicts a flow diagram of a method for performing speckle reduction using polarized light in accordance with example implementations of the present disclosure. In embodiments, various portions of method 1500 may be performed by LIDAR systems of FIGS. 1, and 8-12. With reference to FIG. 15, method 1500 illustrates example functions used by various embodiments. Although specific function blocks ("blocks") are disclosed in method 1500, such blocks are examples. That is, embodiments are well suited to performing various other blocks or variations of the blocks recited in method 1500. It is appreciated that the blocks in method 1500 may be performed in an order different than presented, and that not all of the blocks in method 1500 may be performed.

At block 1501, a beam of polarized light is generated. In some embodiments, the co-propagating, cross-polarized light is generated using a polarizing beam splitter and a single laser source, while in other embodiments multiple laser sources can be used. In some embodiments, the multiple laser beams may have different wavelengths. The generated beam may be transmitted to a target, and reflected light from the target can be detected at a number of detectors.

At block 1503, the polarization state of the polarized beam is transformed using a variable polarization rotator at a rate faster than the data collection rate from the detectors. As discussed above, rapidly modulating the polarization state of the signal transmitted to the target can average the spatial-mode coherence, thereby reducing the negative effects of speckle.

Figure 16:
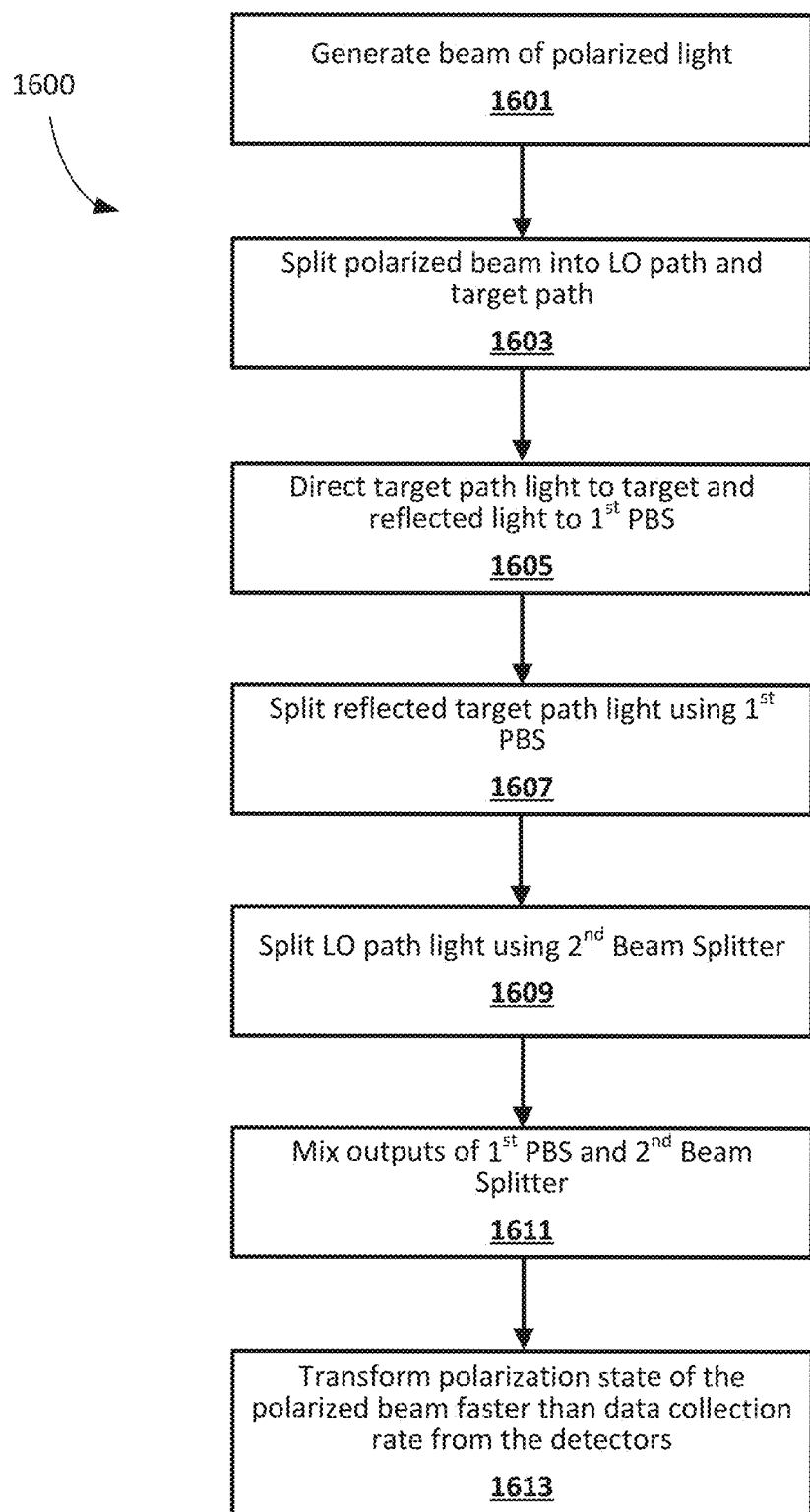
FIG. 16 depicts a flow diagram of another method for performing speckle reduction using polarized light in accordance with example implementations of the present disclosure.

FIG. 16 depicts a flow diagram of another method for performing speckle reduction using polarized light in accordance with example implementations of the present disclosure. In embodiments, various portions of method 1600 may be performed by LIDAR systems of FIGS. 1, and 8-12. With reference to FIG. 16, method 1600 illustrates example functions used by various embodiments. Although specific function blocks ("blocks") are disclosed in method 1600, such blocks are examples. That is, embodiments are well suited to performing various other blocks or variations of the blocks recited in method 1600. It is appreciated that the blocks in method 1600 may be performed in an order different than presented, and that not all of the blocks in method 1600 may be performed.

At block 1601, a beam of polarized light is generated. In some embodiments, the co-propagating, cross-polarized light is generated using a polarizing beam splitter and a single laser source, while in other embodiments multiple laser sources can be used. In some embodiments, the multiple laser beams may have different wavelengths. The generated beam may be transmitted to a target, and reflected light from the target can be detected at a number of detectors.

At block 1603, the beam of co-propagating, cross-polarized light is split into a LO path and a target path. This can be done, for example, using a beam splitter. At block 1605, the target path light is directed to the target using an optical path discriminator, and light reflected from the target is directed to a first polarizing beam splitter. At block 1607, the first polarizing beam splitter splits light reflected from the target and directs it to at least two mixers. At block 1609, the LO path light is split into two portions and also directed to the mixers. In embodiments where the VPR is located ahead of the target path and LO path splitter, the LO path is split into two portions using a second polarizing beam splitter. Where the VPR is located after the LO path splitter, then a standard 2×2 splitter can be used to split the LO path and direct it to the mixers.

At block 1611, the first and second light mixers mix light from the first polarizing beam splitter and the second polarizing beam splitter (or the second 2×2 splitter). The first and second mixers are in communication with first and second detectors, and combined light from the first mixer is received at the first detector and combined light from the second mixer is received at the second detector. As discussed above, in some cases the mixers can bias light to the detectors in favor of the target path.

At block 1613, the polarization state of the polarized beam is transformed using a variable polarization rotator at a rate faster than the data collection rate from the detectors. By rapidly modulating the polarization state of the signal transmitted to the target, one can average the spatial-mode coherence and reduce the negative effects of speckle.

Figure 17:
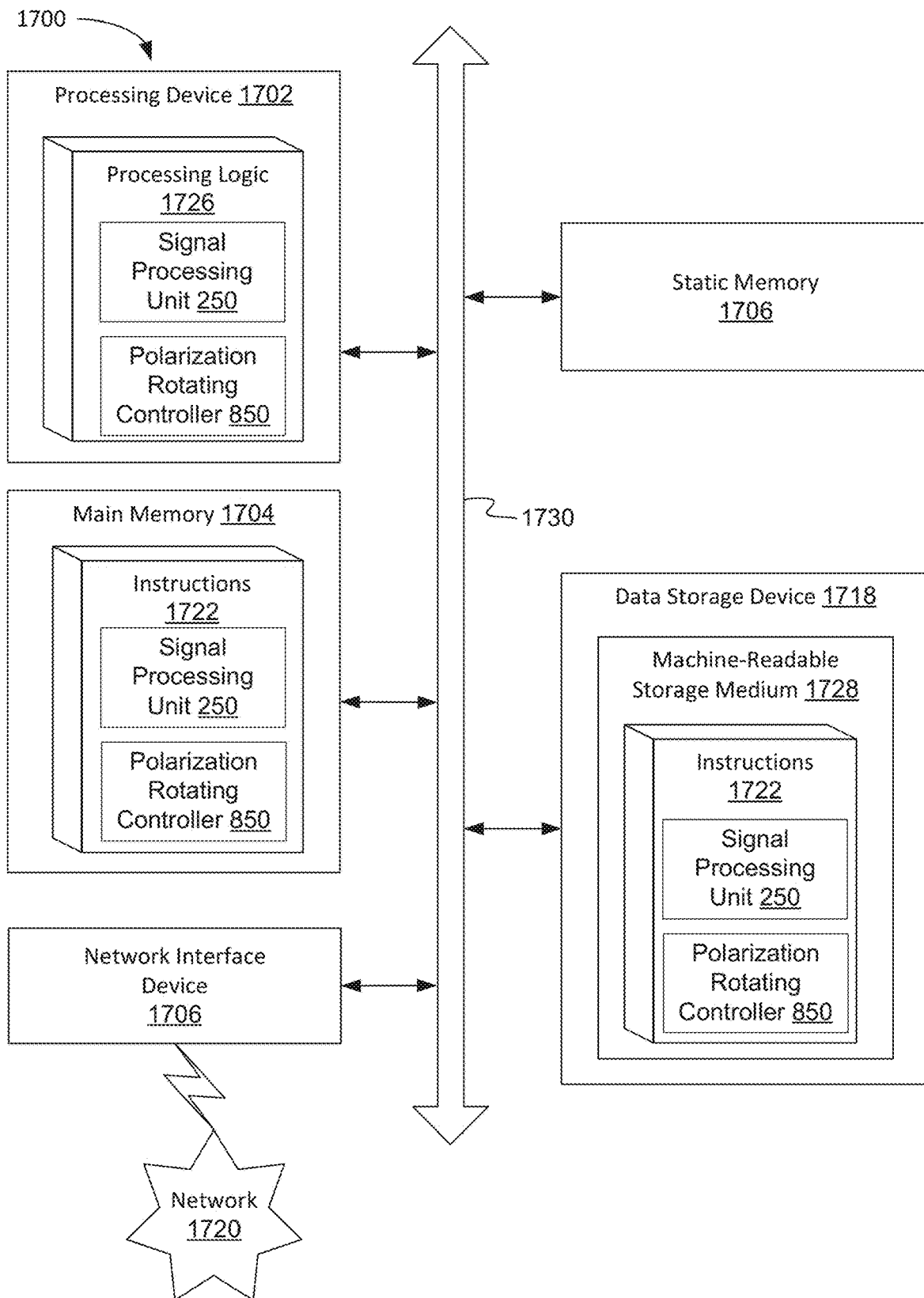
FIG. 17 is a block diagram of an example apparatus that may perform one or more of the operations described herein, in accordance with some embodiments.

FIG. 17 illustrates a diagrammatic representation of a machine in the example form of a computer system 1700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1700 includes a processing device 1702, a main memory 1704 (e.g., read-only memory (ROM), flash memory, dynamic random-access memory (DRAM), a static memory 1706 (e.g., flash memory, static random access memory (SRAM), etc.), and a data storage device 1718, which communicate with each other via a bus 1730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1702 may also be one or more special-purpose processing devices such as an application specific integrated circuit (ASIC), a field programmable gate array (FPGA), a digital signal processor (DSP), network processor, or the like. The processing device 1702 is configured to execute processing logic 1726, which may be one example of the signal processing unit 250 of FIG. 2 or the polarization rotating controller 850 of FIG. 8, for performing the operations and steps discussed herein.

The data storage device 1718 may include a machine-readable storage medium 1728, on which is stored one or more set of instructions 1722 (e.g., software) embodying any one or more of the methodologies of functions described herein, including instructions to cause the processing device 1702 to execute the signal processing unit 250 or the polarization rotating controller 850. The instructions 1722 may also reside, completely or at least partially, within the main memory 1704 or within the processing device 1702 during execution thereof by the computer system 1700; the main memory 1704 and the processing device 1702 also constituting machine-readable storage media. The instructions 1722 may further be transmitted or received over a network 1720 via the network interface device 1708.

The machine-readable storage medium 1728 may also be used to store instructions to perform the signal processing unit 250 of FIG. 2 or the polarization rotating controller 850 of FIG. 8, as described herein. While the machine-readable storage medium 1728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems. Embodiments of the claimed subject matter include, but are not limited to, various operations described herein. These operations may be performed by hardware components, software, firmware, or a combination thereof.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method of operating a frequency-modulated continuous wave (FMCW) light detection and ranging (LIDAR) system comprising:
   transmitting a beam of co-propagating, cross-polarized light to a target;
   receiving return light reflected from the target, wherein the return light comprises a first polarization and a second polarization, wherein the first polarization is parallel to a horizon corresponding to the FMCW LIDAR system and the second polarization is perpendicular to the horizon;
   splitting the return light reflected from the target into a first output comprising the first polarization and a second output comprising the second polarization using a first beam splitter, wherein the first output is directed to a first detector and the second output is directed to a second detector;
   generating, by the first detector, a first electrical signal corresponding to the first polarization;
   generating, by the second detector, a second electrical signal corresponding to the second polarization;
   determining an orientation of the target relative to the horizon based on comparing a first signal-to-noise ratio of the first electrical signal with a second signal-to-noise ratio of the second electrical signal; and
   generating a point cloud based on the orientation of the target.

2. The method of claim 1, wherein the determining further comprises:
   responsive to determining that the first signal-to-noise ratio of the first electrical signal is larger than the second signal-to-noise ratio of the second electrical signal, determining that the target is on a surface traveled upon by the FMCW LIDAR system.

3. The method of claim 1, wherein the determining further comprises:
   responsive to determining that the first signal-to-noise ratio of the first electrical signal is less than the second signal-to-noise ratio of the second electrical signal, determining that the target corresponds to a reflective structure perpendicular to a surface traveled upon by the FMCW LIDAR system.

4. The method of claim 1, further comprising:
   splitting the beam of co-propagating, cross-polarized light into a local oscillator (LO) path beam and a target path beam using a second beam splitter, wherein the target path beam is transmitted to the target;
   splitting the LO path beam into a first LO polarization output and a second LO polarization output using a third beam splitter;
   mixing the first LO polarization output with the first output comprising the first polarization using a first optical mixer to produce a first mixed optical signal; and
   mixing the second LO polarization output with the second output comprising the second polarization using a second optical mixer to produce a second mixed optical signal.

5. The method of claim 4, further comprising:
   biasing light to the first detector and the second detector in favor of light from the target path beam using the first optical mixer and the second optical mixer.

6. The method of claim 4, further comprising:
   receiving light from a plurality of optical sources at the second beam splitter.

7. The method of claim 4, further comprising:
   combining a first pair of light inputs having dissimilar wavelengths and opposite polarizations using a first wavelength division multiplexer (WDM);
   combining a second pair of light inputs having dissimilar wavelengths and opposite polarizations using a second WDM;
   receiving combined light from the first WDM and the second WDM at the first beam splitter; and
   separating the combined light from the first optical mixer and the second optical mixer by wavelength before directing the first output and the second output to the first detector and the second detector.

8. The method of claim 4, further comprising:
   inputting the first mixed optical signal into the first detector to produce the first electrical signal; and
   inputting the second mixed optical signal into the second detector to produce the second electrical signal.

9. A frequency-modulated continuous wave (FMCW) light detection and ranging (LIDAR) apparatus comprising:
   an optical transmitter to transmit a beam of co-propagating, cross-polarized light to a target;
   an optical receiver to receive return light reflected from the target, wherein the return light comprises a first polarization and a second polarization, wherein the first polarization is parallel to a horizon corresponding to the FMCW LIDAR system and the second polarization is perpendicular to the horizon;

a first beam splitter to split the return light reflected from the target into a first output and a second output, wherein the first output comprises the first polarization and is directed to a first detector, and wherein the second output comprises the second polarization and is directed to a second detector;

the first detector to receive the first output and produce a first electrical signal corresponding to the first polarization;

the second detector to receive the second output and produce a second electrical signal corresponding to the second polarization; and a processing device configured to:
determine an orientation of the target relative to the horizon based on comparing a first signal-to-noise ratio of the first electrical signal with a second signal-to-noise ratio of the second electrical signal; and produce a point cloud based on the orientation of the target.

10. The apparatus of claim 9, wherein the processing device is configured to:
determine that the target is on a surface traveled upon by the FMCW LIDAR system in response to the first signal-to-noise ratio of the first electrical signal being larger than the second signal-to-noise ratio of the second electrical signal.

11. The apparatus of claim 9, wherein the processing device is configured to:
determine that the target corresponds to a reflective structure perpendicular to a surface traveled upon by the FMCW LIDAR system in response to the first signal-to-noise ratio of the first electrical signal being less than the second signal-to-noise ratio of the second electrical signal.

12. The apparatus of claim 9, further comprising:
a second beam splitter to split the beam of co-propagating, cross-polarized light into a local oscillator (LO) path beam and a target path beam;
a third beam splitter to split the LO path beam into a first LO polarization output and a second LO polarization output;
a first optical mixer to mix the first LO polarization output with the first output comprising the first polarization to produce a first mixed optical signal; and
a second optical mixer to mix the second LO polarization output with the second output comprising the second polarization to produce a second mixed optical signal.

13. The apparatus of claim 12, wherein the first optical mixer and the second optical mixer are configured to bias light to the first detector and the second detector in favor of light from the target path beam.

14. The apparatus of claim 9, further comprising:
a second beam splitter configured to receive light at a first light input and a second light input and transmit the beam of co-propagating, cross-polarized light to the target, wherein the first light input and the second light input are configured to receive light from a plurality of light sources.

15. The apparatus of claim 14, wherein the plurality of light sources is configured to transmit light having different frequency patterns.

16. The apparatus of claim 14, further comprising a wavelength division multiplexer (WDM) configured to combine light from a first light source and a second light source when the first light source and the second light source have dissimilar wavelengths.

17. A frequency-modulated continuous wave (FMCW) light detection and ranging (LIDAR) system comprising:
a plurality of optical circuits to generate and receive a laser beam, the plurality of optical circuits comprising:
an optical receiver to receive return light reflected from a target, wherein the return light comprises a first polarization and a second polarization, wherein the first polarization is parallel to a horizon corresponding to the FMCW LIDAR system and the second polarization is perpendicular to the horizon;
a first beam splitter to split the return light reflected from the target into a first output and a second output, wherein the first output comprises the first polarization and is directed to a first detector, and wherein the second output comprises the second polarization and is directed to a second detector;
the first detector to receive the first output and produce a first electrical signal corresponding to the first polarization;
the second detector to receive the second output and produce a second electrical signal corresponding to the second polarization; and
a processing device configured to:
determine an orientation of the target relative to the horizon based on comparing a first signal-to-noise ratio of the first electrical signal with a second signal-to-noise ratio of the second electrical signal; and
produce a point cloud based on the orientation of the target.

18. The system of claim 17, the processing device configured to:
determine that the target is on a surface traveled upon by the FMCW LIDAR system in response to the first signal-to-noise ratio of the first electrical signal being larger than the second signal-to-noise ratio of the second electrical signal; and
determine that the target corresponds to a reflective structure perpendicular to the surface traveled upon by the FMCW LIDAR system in response to the first signal-to-noise ratio of the first electrical signal being less than the second signal-to-noise ratio of the second electrical signal.

* * * * *